(12) United States Patent
van de Ven et al.

(10) Patent No.: US 10,209,429 B2
(45) Date of Patent: Feb. 19, 2019

(54) LUMINAIRE WITH SELECTABLE LUMINOUS INTENSITY PATTERN

(71) Applicant: CREE, INC., Durham, NC (US)

(72) Inventors: Antony P. van de Ven, Hong Kong (CN); Eric J. Tarsa, Goleta, CA (US); Bernd P. Keller, Santa Barbara, CA (US); Benjamin A. Jacobson, Chicago, IL (US); Jean-Claude David Ramey de Sugny, Potomac, MD (US)

(73) Assignee: Cree, Inc., Durham, NC (US)

( * ) Notice: Subject to any disclaimer, the term of this patent is extended or adjusted under 35 U.S.C. 154(b) by 713 days.

(21) Appl. No.: 14/472,064

(22) Filed: Aug. 28, 2014

(65) Prior Publication Data

US 2015/0055371 A1    Feb. 26, 2015

Related U.S. Application Data

(63) Continuation-in-part of application No. 13/839,949, filed on Mar. 15, 2013, now Pat. No. 9,581,751, and
(Continued)

(51) Int. Cl.
*F21V 8/00* (2006.01)
*H05B 33/08* (2006.01)
(Continued)

(52) U.S. Cl.
CPC ......... *G02B 6/0073* (2013.01); *G02B 6/0021* (2013.01); *G02B 6/0045* (2013.01);
(Continued)

(58) Field of Classification Search
CPC .. F21K 9/61; F21S 10/02; F21V 13/04; F21V 23/003; F21V 7/0091; F21Y 2103/10;
(Continued)

(56) References Cited

U.S. PATENT DOCUMENTS 615,108 A    11/1898  De Segundo
766,515 A     8/1904  Northrup
(Continued)

FOREIGN PATENT DOCUMENTS

DE    20014114    12/2000
DE    20107425     7/2001
(Continued)

OTHER PUBLICATIONS

European Extended Search Report dated May 19, 2015 for EP Application No. 14192325.0, Applicant, Cree, Inc. (5 pages).
(Continued)

*Primary Examiner* — Hargobind S Sawhney
(74) *Attorney, Agent, or Firm* — Myers Bigel, P.A.

(57) ABSTRACT

A luminaire comprises at least one waveguide having a first region that emits a first luminous intensity pattern and a second region that emits a second luminous intensity pattern different from the first luminous intensity pattern. The luminaire further includes a plurality of LED elements and circuitry to control the plurality of LED elements to cause the luminaire to produce a selected one of a plurality of luminous intensity patterns.

39 Claims, 18 Drawing Sheets

Related U.S. Application Data a continuation-in-part of application No. 13/840,563, filed on Mar. 15, 2013, and a continuation-in-part of application No. 13/938,877, filed on Jul. 10, 2013, now Pat. No. 9,389,367, and a continuation-in-part of application No. 14/101,086, filed on Dec. 9, 2013, now Pat. No. 9,690,029, and a continuation-in-part of application No. 14/101,132, filed on Dec. 9, 2013, now Pat. No. 9,442,243, and a continuation-in-part of application No. 14/101,147, filed on Dec. 9, 2013, now Pat. No. 9,869,432, and a continuation-in-part of application No. 14/101,129, filed on Dec. 9, 2013, and a continuation-in-part of application No. 14/101,051, filed on Dec. 9, 2013, now Pat. No. 9,366,396, and a continuation-in-part of application No. PCT/US2014/013937, filed on Jan. 30, 2014, and a continuation-in-part of application No. PCT/US2014/013931, filed on Jan. 30, 2014.

(60) Provisional application No. 61/922,017, filed on Dec. 30, 2013, provisional application No. 62/020,866, filed on Jul. 3, 2014.

(51) Int. Cl.
*F21Y 115/10* (2016.01)
*F21Y 113/13* (2016.01)

(52) U.S. Cl.
CPC ......... G02B 6/0053 (2013.01); G02B 6/0078 (2013.01); H05B 33/0845 (2013.01); *F21Y 2113/13* (2016.08); *F21Y 2115/10* (2016.08); *G02B 6/0036* (2013.01); *G02B 6/0068* (2013.01)

(58) Field of Classification Search
CPC . F21Y 2115/10; G02B 5/0263; G02B 6/0011; G02B 6/0018; G02B 6/0025; G02B 6/0036; G02B 6/0058; G02B 6/0063; G02B 6/0068; G02B 6/0073; G02B 6/0075; G02B 6/0078; G02B 6/0013; G02B 6/0021; G02B 6/0038; G02B 6/0043; G02B 6/0048; G02B 6/005; G02B 6/0053; G02B 6/0045; F21W 2131/103; H05B 33/0845
See application file for complete search history.

(56) References Cited

U.S. PATENT DOCUMENTS

| | | |
|---|---|---|
| D67,806 S | 7/1925 | Hoyt et al. |
| 2,043,951 A | 6/1936 | Eksergian |
| 2,992,587 A | 4/1958 | Hicks, Jr. et al. |
| 3,372,740 A | 3/1968 | Kastovich et al. |
| 3,532,871 A * | 10/1970 | Shipman .................. B60Q 1/30 359/528 |
| D219,546 S | 12/1970 | Kaiser et al. |
| 4,146,297 A | 3/1979 | Alferness et al. |
| 4,441,787 A | 4/1984 | Lichtenberger |
| 4,714,983 A | 12/1987 | Lang |
| D298,861 S | 12/1988 | Ewing et al. |
| 4,914,553 A | 4/1990 | Hamada et al. |
| 4,954,930 A | 9/1990 | Maegawa et al. |
| 4,977,486 A | 12/1990 | Gotoh |
| 5,005,108 A | 4/1991 | Pristash |
| 5,009,483 A | 4/1991 | Rockwell, III |
| 5,026,161 A | 6/1991 | Werner |
| 5,040,098 A | 8/1991 | Tanaka et al. |
| 5,047,761 A | 9/1991 | Sell |
| 5,061,404 A | 10/1991 | Wu et al. |
| 5,097,258 A | 3/1992 | Iwaki |
| 5,113,177 A | 5/1992 | Cohen |
| 5,113,472 A | 5/1992 | Gualtieri et al. |
| 5,171,080 A | 12/1992 | Bathurst |
| 5,175,787 A | 12/1992 | Gualtieri et al. |
| 5,186,865 A | 2/1993 | Wu et al. |
| 5,245,689 A | 9/1993 | Gualtieri |
| 5,253,317 A | 10/1993 | Allen et al. |
| 5,295,019 A | 3/1994 | Rapoport |
| 5,309,544 A | 5/1994 | Saxe |
| 5,359,687 A | 10/1994 | McFarland |
| 5,359,691 A | 10/1994 | Tai et al. |
| 5,396,350 A | 3/1995 | Beeson et al. |
| 5,398,179 A | 3/1995 | Pacheco |
| 5,400,224 A | 3/1995 | DuNah et al. |
| 5,428,468 A | 6/1995 | Zimmerman et al. |
| 5,461,547 A | 10/1995 | Ciupke et al. |
| 5,462,700 A | 10/1995 | Beeson et al. |
| 5,481,385 A | 1/1996 | Zimmerman et al. |
| 5,506,924 A | 4/1996 | Inoue |
| 5,521,725 A | 5/1996 | Beeson et al. |
| 5,521,726 A | 5/1996 | Zimmerman et al. |
| 5,528,720 A | 6/1996 | Winston et al. |
| 5,537,304 A | 7/1996 | Klaus |
| 5,541,039 A | 7/1996 | McFarland et al. |
| 5,548,670 A | 8/1996 | Koike |
| 5,553,092 A | 9/1996 | Bruce et al. |
| 5,555,109 A | 9/1996 | Zimmerman et al. |
| 5,555,160 A | 9/1996 | Tawara et al. |
| 5,555,329 A | 9/1996 | Kuper et al. |
| 5,572,411 A | 11/1996 | Watai et al. |
| 5,577,492 A | 11/1996 | Parkyn, Jr. et al. |
| 5,584,556 A | 12/1996 | Yokoyama et al. |
| 5,598,280 A | 1/1997 | Nishio et al. |
| 5,598,281 A | 1/1997 | Zimmerman et al. |
| 5,613,751 A | 3/1997 | Parker et al. |
| 5,613,770 A | 3/1997 | Chin, Jr. et al. |
| 5,624,202 A | 4/1997 | Grierson |
| 5,657,408 A | 8/1997 | Ferm et al. |
| 5,658,066 A | 8/1997 | Hirsch |
| 5,659,410 A | 8/1997 | Koike et al. |
| 5,676,453 A | 10/1997 | Parkyn, Jr. et al. |
| 5,676,457 A | 10/1997 | Simon |
| 5,677,702 A | 10/1997 | Inoue et al. |
| 5,685,634 A | 11/1997 | Mulligan |
| 5,696,865 A | 12/1997 | Beeson et al. |
| 5,702,176 A | 12/1997 | Engle |
| 5,718,497 A | 2/1998 | Yokoyama et al. |
| 5,727,107 A | 3/1998 | Umemoto et al. |
| 5,735,590 A | 4/1998 | Kashima et al. |
| 5,739,931 A | 4/1998 | Zimmerman et al. |
| 5,748,828 A | 5/1998 | Steiner et al. |
| 5,761,355 A | 6/1998 | Kuper et al. |
| 5,769,522 A | 6/1998 | Kaneko et al. |
| 5,771,039 A | 6/1998 | Ditzik |
| 5,777,857 A | 7/1998 | Degelmann |
| 5,806,955 A | 9/1998 | Parkyn, Jr. et al. |
| 5,812,714 A | 9/1998 | Hulse |
| 5,818,555 A | 10/1998 | Yokoyama et al. |
| 5,839,823 A | 11/1998 | Hou et al. |
| 5,850,498 A | 12/1998 | Shacklette et al. |
| 5,854,872 A | 12/1998 | Tai |
| 5,863,113 A | 1/1999 | Oe et al. |
| 5,872,883 A | 2/1999 | Ohba et al. |
| 5,897,201 A | 4/1999 | Simon |
| 5,914,759 A | 6/1999 | Higuchi et al. |
| 5,914,760 A | 6/1999 | Daiku |
| 5,949,933 A | 9/1999 | Steiner et al. |
| 5,961,198 A | 10/1999 | Hira et al. |
| 5,967,637 A | 10/1999 | Ishikawa et al. |
| 5,974,214 A | 10/1999 | Shacklette et al. |
| 5,997,148 A | 12/1999 | Ohkawa |
| 5,999,281 A | 12/1999 | Abbott et al. |
| 5,999,685 A | 12/1999 | Goto et al. |
| 6,002,079 A | 12/1999 | Shin et al. |
| 6,002,829 A | 12/1999 | Winston et al. |
| 6,007,209 A | 12/1999 | Pelka |
| 6,043,951 A | 3/2000 | Lee |
| 6,044,196 A | 3/2000 | Winston et al. |
| 6,079,838 A | 6/2000 | Parker et al. |

(56) References Cited

U.S. PATENT DOCUMENTS

| | | |
|---|---|---|
| 6,097,549 A | 8/2000 | Jenkins et al. |
| 6,134,092 A | 10/2000 | Pelka et al. |
| 6,139,163 A | 10/2000 | Satoh et al. |
| 6,139,176 A | 10/2000 | Hulse et al. |
| 6,151,089 A | 11/2000 | Yang et al. |
| 6,155,692 A | 12/2000 | Ohkawa |
| 6,155,693 A | 12/2000 | Spiegel et al. |
| 6,161,939 A | 12/2000 | Bansbach |
| 6,164,790 A | 12/2000 | Lee |
| 6,164,791 A | 12/2000 | Gwo-Juh et al. |
| 6,167,182 A | 12/2000 | Shinohara et al. |
| 6,185,357 B1 | 2/2001 | Zou et al. |
| 6,206,535 B1 | 3/2001 | Hattori et al. |
| 6,231,200 B1 | 5/2001 | Shinohara et al. |
| 6,232,592 B1 | 5/2001 | Sugiyama |
| 6,241,363 B1 | 6/2001 | Lee |
| 6,257,737 B1 | 7/2001 | Marshall et al. |
| 6,259,854 B1 | 7/2001 | Shinji et al. |
| 6,304,693 B1 | 10/2001 | Buelow, II et al. |
| 6,310,704 B1 | 10/2001 | Dogan et al. |
| 6,318,880 B1 | 11/2001 | Siminovitch et al. |
| 6,379,016 B1 | 4/2002 | Boyd et al. |
| 6,379,017 B2 | 4/2002 | Nakabayashi et al. |
| 6,400,086 B1 | 6/2002 | Huter |
| 6,421,103 B2 | 7/2002 | Yamaguchi |
| 6,443,594 B1 | 9/2002 | Marshall et al. |
| 6,461,007 B1 | 10/2002 | Akaoka |
| 6,473,554 B1 | 10/2002 | Pelka et al. |
| 6,480,307 B1 | 11/2002 | Yang et al. |
| 6,485,157 B2 | 11/2002 | Ohkawa |
| 6,508,563 B2 | 1/2003 | Parker et al. |
| 6,523,986 B1 | 2/2003 | Hoffmann |
| 6,536,921 B1 | 3/2003 | Simon |
| 6,541,720 B2 | 4/2003 | Gerald et al. |
| 6,554,451 B1 | 4/2003 | Keuper |
| 6,568,819 B1 | 5/2003 | Yamazaki et al. |
| 6,582,103 B1 | 6/2003 | Popovich et al. |
| 6,585,356 B1 | 7/2003 | Ohkawa |
| 6,598,998 B2 | 7/2003 | West et al. |
| 6,612,723 B2 | 9/2003 | Futhey et al. |
| 6,616,290 B2 | 9/2003 | Ohkawa |
| 6,629,764 B1 | 10/2003 | Uehara |
| 6,633,722 B1 | 10/2003 | Kohara et al. |
| 6,634,772 B2 | 10/2003 | Yaphe et al. |
| 6,647,199 B1 | 11/2003 | Pelka et al. |
| 6,652,109 B2 | 11/2003 | Nakamura |
| 6,637,924 B2 | 12/2003 | Pelka et al. |
| 6,659,628 B2 | 12/2003 | Gomez Del Campo |
| 6,671,452 B2 | 12/2003 | Winston et al. |
| 6,676,284 B1 | 1/2004 | Wynne Willson |
| 6,678,021 B2 | 1/2004 | Ohkawa |
| 6,679,621 B2 | 1/2004 | West et al. |
| 6,712,481 B2 | 3/2004 | Parker et al. |
| 6,724,529 B2 | 4/2004 | Sinkoff |
| 6,724,543 B1 | 4/2004 | Chinniah et al. |
| 6,727,965 B1 | 4/2004 | Kubota |
| 6,752,505 B2 | 6/2004 | Parker et al. |
| 6,755,546 B2 | 6/2004 | Ohkawa |
| 6,755,556 B2 | 6/2004 | Gasquet et al. |
| 6,758,582 B1 | 7/2004 | Hsiao et al. |
| 6,775,460 B2 | 8/2004 | Steiner et al. |
| 6,796,676 B2 | 9/2004 | Severtson et al. |
| 6,802,626 B2 | 10/2004 | Belfer et al. |
| 6,802,628 B2 | 10/2004 | Kuo |
| 6,840,656 B2 | 1/2005 | Kuo |
| 6,845,212 B2 | 1/2005 | Gardiner et al. |
| 6,876,408 B2 | 4/2005 | Yamaguchi |
| 6,894,740 B2 | 5/2005 | Ohkawa |
| 6,896,381 B2 | 5/2005 | Benitez et al. |
| 6,924,943 B2 | 8/2005 | Minano et al. |
| 6,971,758 B2 | 12/2005 | Inui et al. |
| 6,974,241 B2 | 12/2005 | Hara et al. |
| 6,992,335 B2 | 1/2006 | Ohkawa |
| 7,008,097 B1 | 3/2006 | Hulse |
| 7,010,212 B2 | 3/2006 | Emmons et al. |
| 7,021,805 B2 | 4/2006 | Armano et al. |
| 7,025,482 B2 | 4/2006 | Yamashita et al. |
| 7,046,318 B2 | 5/2006 | Yu et al. |
| 7,046,905 B1 | 5/2006 | Gardiner et al. |
| 7,052,157 B1 | 5/2006 | Lau |
| 7,063,430 B2 | 6/2006 | Greiner |
| 7,072,096 B2 | 7/2006 | Holman et al. |
| 7,083,313 B2 | 8/2006 | Smith |
| 7,085,460 B2 | 8/2006 | Leu et al. |
| 7,090,370 B2 | 8/2006 | Clark et al. |
| 7,090,389 B2 | 8/2006 | Parker et al. |
| 7,097,341 B2 | 8/2006 | Tsai |
| 7,106,528 B2 | 9/2006 | Ohmori et al. |
| 7,111,969 B2 | 9/2006 | Bottesch et al. |
| 7,118,253 B1 | 10/2006 | Simon |
| 7,131,764 B2 | 11/2006 | Hsu et al. |
| 7,152,985 B2 | 12/2006 | Benitez et al. |
| 7,160,010 B1 | 1/2007 | Chinniah et al. |
| 7,160,015 B2 | 1/2007 | Parker |
| 7,168,841 B2 | 1/2007 | Hsieh et al. |
| 7,175,330 B2 | 2/2007 | Chen |
| 7,178,941 B2 | 2/2007 | Roberge et al. |
| 7,179,946 B2 | 2/2007 | Saccomanno et al. |
| 7,182,480 B2 | 2/2007 | Kan |
| 7,192,174 B2 | 3/2007 | Myoung |
| 7,195,374 B2 | 3/2007 | Saccomanno et al. |
| 7,204,634 B2 | 4/2007 | Chen et al. |
| 7,209,628 B2 | 4/2007 | Winston et al. |
| 7,218,830 B2 | 5/2007 | Iimura |
| 7,222,995 B1 | 5/2007 | Bayat et al. |
| 7,223,004 B2 | 5/2007 | Chen et al. |
| 7,246,931 B2 | 7/2007 | Hsieh et al. |
| 7,258,467 B2 | 8/2007 | Saccomanno et al. |
| 7,265,800 B2 | 9/2007 | Jagt et al. |
| 7,273,299 B2 | 9/2007 | Parkyn et al. |
| 7,290,906 B2 | 11/2007 | Suzuki et al. |
| 7,292,767 B2 | 11/2007 | Cheng |
| 7,322,733 B2 | 1/2008 | Chang et al. |
| 7,364,342 B2 | 4/2008 | Parker et al. |
| 7,369,918 B2 | 5/2008 | Cosgrove |
| 7,393,124 B1 | 7/2008 | Williams |
| 7,399,108 B2 | 7/2008 | Ayabe et al. |
| 7,400,809 B2 | 7/2008 | Erben et al. |
| 7,404,660 B2 | 7/2008 | Parker |
| 7,407,303 B2 | 8/2008 | Wanninger et al. |
| 7,422,357 B1 | 9/2008 | Chang |
| 7,455,416 B2 | 11/2008 | Chen |
| 7,458,714 B2 | 12/2008 | Chang |
| 7,465,074 B2 | 12/2008 | Blumel |
| 7,486,854 B2 | 2/2009 | Van Ostrand et al. |
| 7,488,093 B1 | 2/2009 | Huang et al. |
| 7,513,672 B2 | 4/2009 | Parker |
| 7,520,650 B2 | 4/2009 | Smith |
| 7,534,013 B1 | 5/2009 | Simon |
| 7,559,672 B1 | 7/2009 | Parkyn et al. |
| 7,566,148 B2 | 7/2009 | Noh et al. |
| 7,566,159 B2 | 7/2009 | Oon et al. |
| 7,581,854 B2 | 9/2009 | Ford |
| 7,614,764 B2 | 11/2009 | Williams et al. |
| 7,626,655 B2 | 12/2009 | Yamazaki et al. |
| 7,628,508 B2 | 12/2009 | Kita et al. |
| 7,635,193 B2 | 12/2009 | Chang |
| 7,635,205 B2 | 12/2009 | Yu et al. |
| 7,639,918 B2 | 12/2009 | Sayers et al. |
| 7,641,363 B1 | 1/2010 | Chang et al. |
| 7,648,256 B2 | 1/2010 | Shiratsuchi et al. |
| 7,654,687 B2 | 2/2010 | Tsai et al. |
| 7,654,719 B2 | 2/2010 | Chang |
| 7,663,804 B2 | 2/2010 | Chang |
| 7,674,018 B2 | 3/2010 | Holder et al. |
| 7,695,165 B2 | 4/2010 | Chang |
| 7,696,531 B2 | 4/2010 | Miyao |
| 7,703,945 B2 | 4/2010 | Leung et al. |
| 7,703,950 B2 | 4/2010 | Ewert et al. |
| 7,703,967 B2 | 4/2010 | Parker |
| 7,710,663 B2 | 5/2010 | Barnes et al. |
| 7,722,224 B1 | 5/2010 | Coleman et al. |
| 7,722,241 B2 | 5/2010 | Chang |
| 7,724,321 B2 | 5/2010 | Hsieh et al. |

(56) References Cited

U.S. PATENT DOCUMENTS

| | | |
|---|---|---|
| 7,730,967 B2 | 6/2010 | Ballantyne et al. |
| 7,736,019 B2 | 6/2010 | Shimada et al. |
| 7,736,045 B2 | 6/2010 | Yamashita et al. |
| 7,750,982 B2 | 7/2010 | Nelson et al. |
| 7,753,551 B2 | 7/2010 | Yaphe et al. |
| 7,758,227 B1 | 7/2010 | Coleman |
| 7,760,290 B2 | 7/2010 | Kang et al. |
| 7,762,705 B2 | 7/2010 | Sakai et al. |
| 7,766,515 B2 | 8/2010 | Condon et al. |
| 7,771,087 B2 | 8/2010 | Wilcox et al. |
| 7,775,697 B2 | 8/2010 | Hirano et al. |
| 7,776,236 B2 | 8/2010 | Shih et al. |
| 7,780,306 B2 | 8/2010 | Hoshi |
| 7,784,954 B1 | 8/2010 | Coleman |
| 7,798,695 B2 | 9/2010 | Parker |
| 7,806,581 B2 | 10/2010 | Lee |
| 7,810,949 B2 | 10/2010 | Chang |
| 7,810,960 B1 | 10/2010 | Soderman et al. |
| 7,810,968 B1 | 10/2010 | Walker et al. |
| 7,813,131 B2 | 10/2010 | Liang |
| 7,821,982 B2 | 10/2010 | Chen et al. |
| 7,826,698 B1 | 11/2010 | Meir et al. |
| 7,845,826 B2 | 12/2010 | Aylward et al. |
| 7,850,357 B2 | 12/2010 | Kim et al. |
| 7,857,487 B2 | 12/2010 | Wu et al. |
| 7,857,619 B2 | 12/2010 | Liu |
| 7,866,871 B2 | 1/2011 | Couzin et al. |
| 7,905,646 B2 | 3/2011 | Adachi et al. |
| 7,907,804 B2 | 3/2011 | Meir et al. |
| 7,909,496 B2 | 3/2011 | Matheson et al. |
| 7,914,192 B2 | 3/2011 | Coleman |
| 7,914,193 B2 | 3/2011 | Peifer et al. |
| 7,914,196 B2 | 3/2011 | Parker et al. |
| 7,929,816 B2 | 4/2011 | Meir et al. |
| 7,934,851 B1 | 5/2011 | Boissevain et al. |
| 7,967,477 B2 | 6/2011 | Bloemen et al. |
| 7,969,531 B1 | 6/2011 | Li et al. |
| 7,970,246 B2 | 6/2011 | Travis et al. |
| 7,976,204 B2 | 7/2011 | Li et al. |
| 7,991,257 B1 | 8/2011 | Coleman |
| 7,997,784 B2 | 8/2011 | Tsai |
| 8,002,450 B2 | 8/2011 | Van Ostrand et al. |
| 8,033,674 B1 | 10/2011 | Coleman et al. |
| 8,033,706 B1 | 10/2011 | Kelly et al. |
| 8,038,308 B2 | 10/2011 | Greiner |
| 8,047,673 B2 | 11/2011 | Santoro |
| 8,047,696 B2 | 11/2011 | Ijzerman et al. |
| 8,052,316 B2 | 11/2011 | Lee |
| 8,054,409 B2 | 11/2011 | Hsieh et al. |
| 8,057,056 B2 | 11/2011 | Zhu et al. |
| 8,061,877 B2 | 11/2011 | Chang |
| 8,064,743 B2 | 11/2011 | Meir et al. |
| 8,067,884 B2 | 11/2011 | Li |
| 8,070,345 B2 | 12/2011 | Zhang et al. |
| 8,075,157 B2 | 12/2011 | Zhang et al. |
| 8,087,807 B2 | 1/2012 | Liu et al. |
| 8,092,068 B2 | 1/2012 | Parker et al. |
| 8,096,671 B1 | 1/2012 | Cronk et al. |
| 8,096,681 B2 | 1/2012 | Fang et al. |
| 8,113,704 B2 | 2/2012 | Bae et al. |
| 8,128,272 B2 | 3/2012 | Fine et al. |
| 8,129,731 B2 | 3/2012 | Vissenberg et al. |
| 8,152,339 B2 | 4/2012 | Morgan |
| 8,152,352 B2 | 4/2012 | Richardson |
| 8,162,524 B2 | 4/2012 | Van Ostrand et al. |
| 8,172,447 B2 | 5/2012 | Meir et al. |
| 8,177,408 B1 | 5/2012 | Coleman |
| 8,182,128 B2 | 5/2012 | Meir et al. |
| 8,186,847 B2 | 5/2012 | Hu et al. |
| 8,189,973 B2 | 5/2012 | Travis et al. |
| 8,192,051 B2 | 6/2012 | Dau et al. |
| 8,198,109 B2 | 6/2012 | Lerman et al. |
| 8,210,716 B2 | 7/2012 | Lerman et al. |
| 8,212,263 B2 | 7/2012 | Bierhuizen et al. |
| 8,218,920 B2 | 7/2012 | Van Ostrand et al. |
| 8,220,955 B2 | 7/2012 | Kwak et al. |
| 8,220,980 B2 | 7/2012 | Gingrich, III |
| 8,226,287 B2 | 7/2012 | Teng et al. |
| 8,231,256 B1 | 7/2012 | Coleman et al. |
| 8,231,258 B2 | 7/2012 | Kim et al. |
| 8,231,259 B2 | 7/2012 | Keller et al. |
| 8,242,518 B2 | 8/2012 | Lerman et al. |
| 8,246,187 B2 | 8/2012 | Cheong et al. |
| 8,246,197 B2 | 8/2012 | Huang |
| 8,249,408 B2 | 8/2012 | Coleman |
| 8,258,524 B2 | 9/2012 | Tan et al. |
| 8,272,756 B1 | 9/2012 | Patrick |
| 8,272,770 B2 | 9/2012 | Richardson |
| 8,277,106 B2 | 10/2012 | Van Gorkom et al. |
| 8,282,261 B2 | 10/2012 | Pance et al. |
| 8,282,853 B2 | 10/2012 | Mori et al. |
| 8,283,354 B2 | 10/2012 | Wilson et al. |
| 8,283,853 B2 | 10/2012 | Yan et al. |
| 8,287,152 B2 | 10/2012 | Gill |
| 8,292,467 B2 | 10/2012 | Vissenberg et al. |
| 8,297,786 B2 | 10/2012 | Shani et al. |
| 8,297,801 B2 | 10/2012 | Coushaine et al. |
| 8,297,818 B2 | 10/2012 | Richardson |
| 8,301,002 B2 | 10/2012 | Shani |
| 8,310,158 B2 | 11/2012 | Coplin et al. |
| 8,314,566 B2 | 11/2012 | Steele et al. |
| 8,317,363 B2 | 11/2012 | Zheng |
| 8,317,366 B2 | 11/2012 | Dalton et al. |
| 8,319,130 B2 | 11/2012 | Lee et al. |
| 8,328,403 B1 | 12/2012 | Morgan et al. |
| 8,328,406 B2 | 12/2012 | Zimmermann |
| 8,331,746 B2 | 12/2012 | Bogner et al. |
| 8,338,199 B2 | 12/2012 | Lerman et al. |
| 8,338,839 B2 | 12/2012 | Lerman et al. |
| 8,338,840 B2 | 12/2012 | Lerman et al. |
| 8,338,841 B2 | 12/2012 | Lerman et al. |
| 8,338,842 B2 | 12/2012 | Lerman et al. |
| 8,344,397 B2 | 1/2013 | Lerman et al. |
| 8,348,446 B2 | 1/2013 | Nakamura |
| 8,348,489 B2 | 1/2013 | Holman et al. |
| 8,351,744 B2 | 1/2013 | Travis et al. |
| 8,353,606 B2 | 1/2013 | Jeong |
| 8,369,678 B2 | 2/2013 | Chakmajkjian et al. |
| 8,371,735 B2 | 2/2013 | Chen et al. |
| 8,376,582 B2 | 2/2013 | Catone et al. |
| 8,382,354 B2 | 2/2013 | Kim et al. |
| 8,382,387 B1 | 2/2013 | Sandoval |
| 8,388,173 B2 | 3/2013 | Sloan et al. |
| 8,388,190 B2 | 3/2013 | Li et al. |
| 8,398,259 B2 | 3/2013 | Kwak et al. |
| 8,398,262 B2 | 3/2013 | Sloan et al. |
| 8,408,737 B2 | 4/2013 | Wright et al. |
| 8,410,726 B2 | 4/2013 | Dau et al. |
| 8,412,010 B2 | 4/2013 | Ghosh et al. |
| 8,414,154 B2 | 4/2013 | Dau et al. |
| 8,419,224 B2 | 4/2013 | Wan-Chih et al. |
| 8,430,536 B1 | 4/2013 | Zhao |
| 8,430,548 B1 | 4/2013 | Kelly et al. |
| 8,432,628 B2 | 4/2013 | Shaiu et al. |
| 8,434,892 B2 | 5/2013 | Zwak et al. |
| 8,434,893 B2 | 5/2013 | Boyer et al. |
| 8,434,913 B2 | 5/2013 | Vissenberg et al. |
| 8,434,914 B2 | 5/2013 | Li et al. |
| 8,449,128 B2 | 5/2013 | Ko et al. |
| 8,449,142 B1 | 5/2013 | Martin et al. |
| 8,454,218 B2 | 6/2013 | Wang et al. |
| 8,461,602 B2 | 6/2013 | Lerman et al. |
| 8,469,559 B2 | 6/2013 | Williams |
| 8,475,010 B2 | 7/2013 | Vissenberg et al. |
| 8,482,186 B2 | 7/2013 | Wang et al. |
| 8,485,684 B2 | 7/2013 | Lou et al. |
| 8,506,112 B1 | 8/2013 | Dau et al. |
| 8,511,868 B2 | 8/2013 | Haugaard et al. |
| 8,534,896 B2 | 9/2013 | Boonekamp |
| 8,534,901 B2 | 9/2013 | Panagotacos et al. |
| 8,541,795 B2 | 9/2013 | Keller et al. |
| 8,547,022 B2 | 10/2013 | Summerford et al. |
| 8,564,004 B2 | 10/2013 | Tarsa et al. |
| 8,567,983 B2 | 10/2013 | Boyer et al. |

(56) References Cited

U.S. PATENT DOCUMENTS

| | | |
|---|---|---|
| 8,567,986 B2 | 10/2013 | Szprengiel et al. |
| 8,573,823 B2 | 11/2013 | Dau et al. |
| 8,585,253 B2 | 11/2013 | Duong et al. |
| 8,591,072 B2 | 11/2013 | Shani et al. |
| 8,591,090 B2 | 11/2013 | Lin |
| 8,593,070 B2 | 11/2013 | Wang et al. |
| D695,431 S | 12/2013 | Lay |
| 8,598,778 B2 | 12/2013 | Allen et al. |
| 8,602,586 B1 | 12/2013 | Dau et al. |
| 8,608,351 B2 | 12/2013 | Peifer |
| 8,616,746 B2 | 12/2013 | Shinohara |
| 8,618,735 B2 | 12/2013 | Coplin et al. |
| 8,632,214 B1 | 1/2014 | Tickner et al. |
| 8,641,219 B1 | 2/2014 | Johnson et al. |
| 8,657,479 B2 | 2/2014 | Morgan et al. |
| D702,377 S | 4/2014 | Lay |
| 8,696,173 B2 | 4/2014 | Urtiga et al. |
| 8,702,281 B2 | 4/2014 | Okada et al. |
| 8,724,052 B2 | 5/2014 | Hsieh et al. |
| 8,740,440 B2 | 6/2014 | Mizuno et al. |
| 8,755,005 B2 | 6/2014 | Bierhuizen et al. |
| 8,770,821 B2 | 7/2014 | Ijzerman et al. |
| 8,780,299 B2 | 7/2014 | Ryu et al. |
| 8,833,996 B2 | 9/2014 | Dau et al. |
| 8,833,999 B2 | 9/2014 | Wang et al. |
| 8,840,276 B2 | 9/2014 | Shani et al. |
| 8,851,712 B2 | 10/2014 | Shani et al. |
| 8,864,360 B2 | 10/2014 | Parker et al. |
| 8,870,430 B2 | 10/2014 | Kamikatano et al. |
| 8,870,431 B2 | 10/2014 | Lin et al. |
| 8,882,323 B2 | 11/2014 | Solomon et al. |
| 8,905,569 B2 | 12/2014 | Thomas et al. |
| 8,915,611 B2 | 12/2014 | Zhang |
| 8,917,962 B1 | 12/2014 | Nichol et al. |
| 8,950,919 B2 | 2/2015 | Chen |
| 8,960,969 B2 | 2/2015 | Freund |
| 8,975,827 B2 | 3/2015 | Chobot et al. |
| 9,046,225 B2 | 6/2015 | Meyers et al. |
| 9,081,125 B2 | 7/2015 | Dau et al. |
| 9,097,824 B2 | 8/2015 | Vissenberg et al. |
| 2001/0019479 A1 | 9/2001 | Nakabayashi et al. |
| 2002/0061178 A1 | 5/2002 | Winston et al. |
| 2002/0172039 A1 | 11/2002 | Inditsky |
| 2003/0034985 A1 | 2/2003 | Needham Riddle et al. |
| 2003/0146688 A1 | 8/2003 | Kitazawa et al. |
| 2004/0008952 A1 | 1/2004 | Kragl |
| 2004/0080938 A1 | 4/2004 | Holman et al. |
| 2004/0135933 A1 | 7/2004 | Leu et al. |
| 2004/0146241 A1 | 7/2004 | Deladurantaye et al. |
| 2004/0213003 A1 | 10/2004 | Lauderdale et al. |
| 2004/0240217 A1 | 12/2004 | Rice |
| 2005/0024744 A1 | 2/2005 | Falicoff et al. |
| 2005/0111235 A1 | 5/2005 | Sukuzi et al. |
| 2005/0140848 A1* | 6/2005 | Yoo .................... G02B 6/0043 |
| | | 349/64 |
| 2005/0201103 A1 | 9/2005 | Saccomanno et al. |
| 2005/0210643 A1 | 9/2005 | Mezei et al. |
| 2005/0286251 A1 | 12/2005 | Smith |
| 2006/0002146 A1 | 1/2006 | Baba |
| 2006/0072203 A1 | 4/2006 | Lee |
| 2006/0076568 A1 | 4/2006 | Keller et al. |
| 2006/0147151 A1 | 7/2006 | Wanninger et al. |
| 2006/0187651 A1 | 8/2006 | Kim et al. |
| 2006/0262521 A1 | 11/2006 | Piepgras et al. |
| 2007/0081780 A1 | 4/2007 | Scholl |
| 2007/0086179 A1 | 4/2007 | Chen et al. |
| 2007/0121340 A1 | 5/2007 | Hoshi |
| 2007/0139905 A1 | 6/2007 | Birman et al. |
| 2007/0139965 A1* | 6/2007 | Liao .................... G02B 6/0036 |
| | | 362/615 |
| 2007/0189033 A1 | 8/2007 | Watanabe et al. |
| 2007/0223247 A1 | 9/2007 | Lee et al. |
| 2007/0245607 A1 | 10/2007 | Awai et al. |
| 2007/0253058 A1 | 11/2007 | Wood |
| 2007/0274654 A1 | 11/2007 | Choudhury et al. |
| 2007/0279933 A1* | 12/2007 | Shiau .................... G02B 6/0053 |
| | | 362/606 |
| 2008/0002399 A1 | 1/2008 | Villard et al. |
| 2008/0030650 A1* | 2/2008 | Kitagawa ............. G02B 6/0068 |
| | | 349/65 |
| 2008/0037284 A1 | 2/2008 | Rudisill |
| 2008/0094853 A1 | 4/2008 | Kim et al. |
| 2008/0137695 A1 | 6/2008 | Takahashi et al. |
| 2008/0186273 A1 | 8/2008 | Krijn et al. |
| 2008/0192458 A1 | 8/2008 | Li |
| 2008/0199143 A1 | 8/2008 | Turner |
| 2008/0211990 A1* | 9/2008 | Sakai .................... G02B 6/0078 |
| | | 349/64 |
| 2008/0232135 A1 | 9/2008 | Kinder et al. |
| 2008/0266879 A1 | 10/2008 | Chang |
| 2008/0266901 A1 | 10/2008 | Chang |
| 2008/0285304 A1* | 11/2008 | Rankin, Jr. .......... G02B 6/0036 |
| | | 362/602 |
| 2008/0285310 A1* | 11/2008 | Aylward ................ G02B 6/001 |
| | | 362/626 |
| 2009/0027893 A1 | 1/2009 | Chang |
| 2009/0091948 A1 | 4/2009 | Wang et al. |
| 2009/0103293 A1 | 4/2009 | Harbers et al. |
| 2009/0175050 A1 | 7/2009 | Marttila et al. |
| 2009/0196071 A1 | 8/2009 | Matheson et al. |
| 2009/0257242 A1 | 10/2009 | Wendman |
| 2009/0297090 A1 | 12/2009 | Bogner et al. |
| 2009/0309494 A1 | 12/2009 | Patterson et al. |
| 2009/0310367 A1 | 12/2009 | Kuo |
| 2009/0316414 A1 | 12/2009 | Yang et al. |
| 2010/0008088 A1 | 1/2010 | Koizumi et al. |
| 2010/0008628 A1 | 1/2010 | Shani |
| 2010/0027257 A1 | 2/2010 | Boonekamp et al. |
| 2010/0046219 A1 | 2/2010 | Pijlman et al. |
| 2010/0053959 A1 | 3/2010 | Ijzerman et al. |
| 2010/0073597 A1 | 3/2010 | Bierhuizen et al. |
| 2010/0073911 A1* | 3/2010 | Ohkawa ............... G02B 6/0016 |
| | | 362/97.1 |
| 2010/0079843 A1 | 4/2010 | Derichs et al. |
| 2010/0079980 A1 | 4/2010 | Sakai |
| 2010/0110673 A1 | 5/2010 | Bergman et al. |
| 2010/0110679 A1 | 5/2010 | Teng et al. |
| 2010/0118531 A1 | 5/2010 | Montagne |
| 2010/0128483 A1 | 5/2010 | Reo et al. |
| 2010/0133422 A1 | 6/2010 | Lin et al. |
| 2010/0157577 A1 | 6/2010 | Montgomery et al. |
| 2010/0208460 A1 | 8/2010 | Ladewig et al. |
| 2010/0220484 A1 | 9/2010 | Shani et al. |
| 2010/0220497 A1 | 9/2010 | Ngai |
| 2010/0231143 A1 | 9/2010 | May et al. |
| 2010/0238645 A1 | 9/2010 | Bailey |
| 2010/0238671 A1 | 9/2010 | Catone et al. |
| 2010/0246158 A1 | 9/2010 | Van Gorkom et al. |
| 2010/0253881 A1* | 10/2010 | Han .................. G02F 1/133615 |
| | | 349/65 |
| 2010/0254129 A1 | 10/2010 | Le Toquin et al. |
| 2010/0301360 A1 | 12/2010 | Van De Ven et al. |
| 2010/0302135 A1 | 12/2010 | Larson et al. |
| 2010/0302218 A1 | 12/2010 | Bita et al. |
| 2010/0302616 A1 | 12/2010 | Bita et al. |
| 2010/0302783 A1 | 12/2010 | Shastry et al. |
| 2010/0302803 A1 | 12/2010 | Bita et al. |
| 2010/0315833 A1 | 12/2010 | Holman et al. |
| 2010/0320904 A1 | 12/2010 | Meir |
| 2010/0328936 A1 | 12/2010 | Pance et al. |
| 2011/0007505 A1 | 1/2011 | Wang et al. |
| 2011/0013397 A1 | 1/2011 | Catone et al. |
| 2011/0013420 A1 | 1/2011 | Coleman et al. |
| 2011/0013421 A1* | 1/2011 | Um ....................... G02B 6/0078 |
| | | 362/612 |
| 2011/0037388 A1 | 2/2011 | Lou et al. |
| 2011/0044022 A1 | 2/2011 | Ko et al. |
| 2011/0044582 A1 | 2/2011 | Travis et al. |
| 2011/0051457 A1 | 3/2011 | Chen |
| 2011/0058372 A1 | 3/2011 | Lerman et al. |
| 2011/0063830 A1 | 3/2011 | Narendran et al. |
| 2011/0063838 A1 | 3/2011 | Dau et al. |
| 2011/0063855 A1 | 3/2011 | Vissenberg |

(56) References Cited

U.S. PATENT DOCUMENTS

| | | |
|---|---|---|
| 2011/0069843 A1 | 3/2011 | Cohen et al. |
| 2011/0122616 A1 | 5/2011 | Hochstein |
| 2011/0163681 A1 | 7/2011 | Dau et al. |
| 2011/0163683 A1 | 7/2011 | Steele et al. |
| 2011/0170289 A1 | 7/2011 | Allen et al. |
| 2011/0180818 A1 | 7/2011 | Lerman et al. |
| 2011/0187273 A1 | 8/2011 | Summerford et al. |
| 2011/0193105 A1 | 8/2011 | Lerman et al. |
| 2011/0193106 A1 | 8/2011 | Lerman et al. |
| 2011/0193114 A1 | 8/2011 | Lerman et al. |
| 2011/0195532 A1 | 8/2011 | Lerman et al. |
| 2011/0198631 A1 | 8/2011 | Lerman et al. |
| 2011/0198632 A1 | 8/2011 | Lerman et al. |
| 2011/0199769 A1 | 8/2011 | Bretschneider et al. |
| 2011/0204390 A1 | 8/2011 | Lerman et al. |
| 2011/0204391 A1 | 8/2011 | Lerman et al. |
| 2011/0210861 A1 | 9/2011 | Winton et al. |
| 2011/0228527 A1 | 9/2011 | Van Gorkom et al. |
| 2011/0233568 A1 | 9/2011 | An et al. |
| 2011/0248287 A1 | 10/2011 | Yuan et al. |
| 2011/0249467 A1 | 10/2011 | Boonekamp |
| 2011/0261570 A1 | 10/2011 | Okada et al. |
| 2011/0273079 A1 | 11/2011 | Pickard et al. |
| 2011/0273882 A1 | 11/2011 | Pickard |
| 2011/0280043 A1 | 11/2011 | Van Ostrand et al. |
| 2011/0299807 A1 | 12/2011 | Kim et al. |
| 2011/0305018 A1 | 12/2011 | Angelini et al. |
| 2011/0305027 A1 | 12/2011 | Ham |
| 2011/0317436 A1 | 12/2011 | Kuan |
| 2012/0008338 A1 | 1/2012 | Ono et al. |
| 2012/0014128 A1 | 1/2012 | Lin |
| 2012/0020108 A1 | 1/2012 | Chang |
| 2012/0026728 A1 | 2/2012 | Lou et al. |
| 2012/0026828 A1 | 2/2012 | Fjellstad et al. |
| 2012/0033445 A1 | 2/2012 | Desmet et al. |
| 2012/0039073 A1 | 2/2012 | Tong |
| 2012/0051041 A1 | 3/2012 | Edmond et al. |
| 2012/0057325 A1 | 3/2012 | Hikmet |
| 2012/0068615 A1 | 3/2012 | Duong |
| 2012/0069575 A1 | 3/2012 | Koh et al. |
| 2012/0069579 A1 | 3/2012 | Koh et al. |
| 2012/0069595 A1 | 3/2012 | Catalano |
| 2012/0075873 A1 | 3/2012 | Cooper |
| 2012/0113676 A1 | 5/2012 | Van Dijk et al. |
| 2012/0114284 A1 | 5/2012 | Ender |
| 2012/0120651 A1 | 5/2012 | Peck |
| 2012/0140461 A1 | 6/2012 | Pickard |
| 2012/0147624 A1 | 6/2012 | Li et al. |
| 2012/0152490 A1 | 6/2012 | Wen et al. |
| 2012/0161009 A1 | 6/2012 | Kothari et al. |
| 2012/0170266 A1 | 7/2012 | Germain et al. |
| 2012/0170316 A1 | 7/2012 | Lee et al. |
| 2012/0170318 A1 | 7/2012 | Tsai et al. |
| 2012/0182767 A1* | 7/2012 | Petcavich ............ G02B 5/0221 362/627 |
| 2012/0188774 A1 | 7/2012 | Okada |
| 2012/0212957 A1 | 8/2012 | Hyun et al. |
| 2012/0230019 A1 | 9/2012 | Peifer |
| 2012/0242930 A1 | 9/2012 | Ryu et al. |
| 2012/0243259 A1* | 9/2012 | Zhou ................ G02B 6/0058 362/613 |
| 2012/0250296 A1 | 10/2012 | Lu et al. |
| 2012/0250319 A1 | 10/2012 | Dau et al. |
| 2012/0257383 A1 | 10/2012 | Zhang |
| 2012/0268931 A1 | 10/2012 | Lerman et al. |
| 2012/0268932 A1 | 10/2012 | Lerman et al. |
| 2012/0287619 A1 | 11/2012 | Pickard et al. |
| 2012/0287654 A1 | 11/2012 | He et al. |
| 2012/0287668 A1* | 11/2012 | Richardson ............ F21V 29/00 362/602 |
| 2012/0287677 A1 | 11/2012 | Wheatley et al. |
| 2012/0298181 A1 | 11/2012 | Cashion et al. |
| 2012/0307496 A1 | 12/2012 | Phillips et al. |
| 2012/0320626 A1 | 12/2012 | Quilici et al. |
| 2012/0326614 A1 | 12/2012 | Tsuji et al. |
| 2013/0003348 A1 | 1/2013 | Meir et al. |
| 2013/0003363 A1 | 1/2013 | Lu et al. |
| 2013/0003409 A1 | 1/2013 | Vissenberg et al. |
| 2013/0010464 A1 | 1/2013 | Shuja et al. |
| 2013/0028557 A1 | 1/2013 | Lee et al. |
| 2013/0033867 A1 | 2/2013 | Coplin et al. |
| 2013/0037838 A1 | 2/2013 | Speier et al. |
| 2013/0038219 A1 | 2/2013 | Dau et al. |
| 2013/0039050 A1 | 2/2013 | Dau et al. |
| 2013/0039090 A1 | 2/2013 | Dau et al. |
| 2013/0044480 A1 | 2/2013 | Sato et al. |
| 2013/0077298 A1 | 3/2013 | Steele et al. |
| 2013/0107518 A1 | 5/2013 | Boyer et al. |
| 2013/0107527 A1 | 5/2013 | Boyer et al. |
| 2013/0107528 A1 | 5/2013 | Boyer et al. |
| 2013/0128593 A1 | 5/2013 | Luo |
| 2013/0141937 A1* | 6/2013 | Katsuta ................ G02B 6/005 362/606 |
| 2013/0170210 A1 | 7/2013 | Athalye |
| 2013/0201715 A1 | 8/2013 | Dau et al. |
| 2013/0208461 A1 | 8/2013 | Warton et al. |
| 2013/0208495 A1 | 8/2013 | Dau et al. |
| 2013/0214300 A1 | 8/2013 | Lerman et al. |
| 2013/0215612 A1 | 8/2013 | Garcia |
| 2013/0223057 A1 | 8/2013 | Gassner et al. |
| 2013/0229804 A1 | 9/2013 | Holder et al. |
| 2013/0229810 A1 | 9/2013 | Pelka et al. |
| 2013/0250584 A1 | 9/2013 | Wang et al. |
| 2013/0279198 A1 | 10/2013 | Lin et al. |
| 2013/0294059 A1 | 11/2013 | Galluccio et al. |
| 2013/0294063 A1 | 11/2013 | Lou et al. |
| 2013/0300310 A1 | 11/2013 | Hu et al. |
| 2013/0317784 A1 | 11/2013 | Huang et al. |
| 2013/0322116 A1 | 12/2013 | Piljman et al. |
| 2013/0328073 A1 | 12/2013 | Lowes et al. |
| 2013/0336001 A1 | 12/2013 | Boonekamp |
| 2013/0343045 A1 | 12/2013 | Lodhie et al. |
| 2013/0343055 A1 | 12/2013 | Eckert et al. |
| 2013/0343079 A1 | 12/2013 | Unger et al. |
| 2014/0003041 A1 | 1/2014 | Dau et al. |
| 2014/0029257 A1 | 1/2014 | Boyer et al. |
| 2014/0036510 A1 | 2/2014 | Preston et al. |
| 2014/0043850 A1 | 2/2014 | Thompson et al. |
| 2014/0071687 A1 | 3/2014 | Tickner et al. |
| 2014/0168955 A1 | 6/2014 | Gershaw |
| 2014/0211457 A1 | 7/2014 | Tarsa et al. |
| 2014/0211462 A1 | 7/2014 | Keller et al. |
| 2014/0211476 A1 | 7/2014 | Yuan et al. |
| 2014/0211495 A1 | 7/2014 | Yuan et al. |
| 2014/0211496 A1 | 7/2014 | Durkee |
| 2014/0211497 A1 | 7/2014 | Yuan et al. |
| 2014/0211502 A1 | 7/2014 | Keller et al. |
| 2014/0211503 A1 | 7/2014 | Tarsa et al. |
| 2014/0211504 A1 | 7/2014 | Yuan et al. |
| 2014/0211508 A1 | 7/2014 | Yuan et al. |
| 2014/0212090 A1 | 7/2014 | Wilcox et al. |
| 2014/0268762 A1 | 9/2014 | Raleigh et al. |
| 2014/0268875 A1 | 9/2014 | Durkee |
| 2014/0268879 A1* | 9/2014 | Mizuyama ............ G02B 6/0043 362/618 |
| 2014/0270672 A1 | 9/2014 | Durkee |
| 2014/0286052 A1* | 9/2014 | McCollum ............ G02B 6/0075 362/613 |
| 2014/2688761 | 9/2014 | Raleigh et al. |
| 2014/0334126 A1 | 11/2014 | Speier et al. |
| 2014/0347885 A1 | 11/2014 | Wilcox et al. |
| 2014/0355297 A1 | 12/2014 | Castillo et al. |
| 2014/0355302 A1 | 12/2014 | Wilcox et al. |
| 2015/0003059 A1 | 1/2015 | Haitz et al. |
| 2015/0049507 A1 | 2/2015 | Shani et al. |
| 2015/0049511 A1 | 2/2015 | Tarsa et al. |
| 2015/0055369 A1 | 2/2015 | Tarsa et al. |
| 2015/0055371 A1 | 2/2015 | van de Ven et al. |
| 2015/0109820 A1 | 4/2015 | Wilcox et al. |
| 2015/0160396 A1 | 6/2015 | Wilcox et al. |
| 2015/0177439 A1 | 6/2015 | Durkee et al. |
| 2015/0192742 A1 | 7/2015 | Tarsa et al. |
| 2015/0198760 A1 | 7/2015 | Wilcox et al. |

(56) References Cited

U.S. PATENT DOCUMENTS

| | | | |
|---|---|---|---|
| 2015/0204491 | A1 | 7/2015 | Yuan et al. |
| 2015/0260905 | A1 | 9/2015 | Yuan et al. |
| 2017/0205552 | A1 | 7/2017 | Gierens et al. |

FOREIGN PATENT DOCUMENTS

| | | | |
|---|---|---|---|
| DE | 10047101 | | 5/2002 |
| DE | 10203106 | | 7/2003 |
| DE | 10302563 | | 7/2004 |
| DE | 10302564 | | 7/2004 |
| DE | 102006009325 | | 9/2007 |
| DE | 102006011296 | | 9/2007 |
| DE | 102006013343 | | 9/2007 |
| JP | 10173870 | A * | 6/1998 |
| JP | H10173870 | | 6/1998 |
| JP | 2000/147264 | | 5/2000 |
| JP | 2004/0227934 | | 8/2004 |
| JP | 3093080 | | 12/2005 |
| JP | 2006/0131444 | | 5/2006 |
| JP | 2006/131444 | | 5/2006 |
| JP | 2006/0221922 | | 8/2006 |
| JP | 2007/0123130 | | 5/2007 |
| WO | WO 96/21122 | | 7/1996 |
| WO | WO 96/21884 | | 7/1996 |
| WO | WO 99/4531 | | 1/1999 |
| WO | WO 2001/02772 | | 1/2001 |
| WO | WO 2003/031869 | | 4/2003 |
| WO | 2004005983 | A1 | 1/2004 |
| WO | WO 2008/152561 | | 12/2008 |
| WO | WO 2009/012484 | | 1/2009 |
| WO | WO 2011/130648 | | 10/2011 |
| WO | WO 2013/078463 | | 5/2013 |
| WO | WO 2013/082537 | | 6/2013 |
| WO | WO 2014/120968 | | 8/2014 |
| WO | WO 2014120672 | A2 | 8/2014 |
| WO | WO 2014120672 | A3 | 8/2014 |
| WO | WO 2014/145283 | | 9/2014 |
| WO | 2015028328 | A2 | 3/2015 |

OTHER PUBLICATIONS

USPTO Office action dated Nov. 13, 2015, for U.S. Appl. No. 13/841,622 Applicant, Cree, Inc. (7 pages).
Web page at http://www.oluce.com/en/lamps/table/colombo-281-detail, printed Nov. 19, 2013 (2 pages).
Web page at http://www.fusionoptix.com/lighting/components/array-optics.htm, printed May 9, 2013 (2 pages).
Iijima et al., "Document Scanner Using Polymer Waveguides With a Microlens Array," Optical Engineering, vol. 41, Issue 11, pp. 2743-2748, Oct. 28, 2002 (4 pages).
Invitation to Pay Additional Fees for International Application No. PCT/US2014/013840, dated May 8, 2014, Applicant, Cree, Inc. (2 pages).
Invitation to Pay Additional Fees for International Application No. PCT/US2014/013408, dated May 8, 2014, Applicant, Cree, Inc. (2 pages).
International Search Report and Written Opinion for International Application No. PCT/US2014/013408, dated Jul. 17, 2014, Applicant, Cree, Inc. (21 pages).
International Search Report and Written Opinion for International Application No. PCT/US2014/013840, dated Jul. 28, 2014, Applicant, Cree, Inc. (17 pages).
International Search Report and Written Opinion dated Jul. 28, 2014, for International Application No. PCT/US2014/28938, Applicant, Cree, Inc. (19 pages).
International Search Report and Written Opinion dated Jul. 24, 2014, for International Application No. PCT/US2014/28887, Applicant, Cree, Inc. (15 pages).
U.S. Appl. No. 13/657,421, filed Oct. 22, 2012 (38 pages).
Drain, Kieran, "Transformations in Lighting: 2011 DOE Solid-State Lighting R&D Workshop, Panel 3: Novel Lighting Concepts for Large Interior Spaces," PowerPoint presentation printed Nov. 2013 (23 pages).
Ji et al., "Electrically Controllable Microlens Array Fabricated by Anisotropic Phase Separation From Liquid-Crystal and Polymer Composite Materials," vol. 28, No. 13, Optics Letters, pp. 1147-1149, Jul. 1, 2003 (4 pages).
International Search Report and Written Opinion dated Jan. 11, 2016, for International Application No. PCT/US2015/032040, Applicant, Cree, Inc., (16 pages).
International Search Report and Written Opinion dated Mar. 25, 2015, for International Application No. PCT/US2014/072860, Applicant, Cree, Inc. (14 pages).
Invitation to Pay Additional Fees for International Application No. PCT/US2015/032040 dated Aug. 6, 2015, Applicant, Cree, Inc. (2 pages).
International Search Report and Written Opinion for International Application No. PCT/US2015/020601, dated Jul. 31, 2015, Applicant, Cree, Inc. (23 pages).
U.S. Appl. No. 14/291,829, filed May 30, 2014, Inventors, Yuan et al. (65 pages).
U.S. Appl. No. 14/292,001, filed May 30, 2014, Inventors, Hu et al. (38 pages).
U.S. Appl. No. 14/292,286, filed May 30, 2014, Inventors, McBryde et al. (103 pages).
U.S. Appl. No. 61/932,058, filed Jan. 27, 2014, Inventors, Carrigan et al. (203 pages).
U.S. Appl. No. 14/618,884, filed Feb. 10, 2015, Inventors, Castillo et al. (56 pages).
U.S. Appl. No. 14/462,322, filed Aug. 18, 2014, Inventors, Castillo et al. (31 pages).
U.S. Appl. No. 62/088,375, filed Dec. 5, 2014, Inventors, Hussell et al. (51 pages).
U.S. Appl. No. 14/618,819, filed Feb. 10, 2015, Inventors, Bendtsen et al. (37 pages).
U.S. Appl. No. 14/801,476, filed Jul. 16, 2015, Inventors, de Sugny et al. (38 pages).
U.S. Appl. No. 14/472,078, filed Aug. 28, 2014, Inventors, Tarsa et al. (60 pages).
IPRP for International Application No. PCT/US2014/013840, dated Aug. 13, 2015, Applicant, Cree, Inc. (10 pages).
IPRP for International Application No. PCT/US2014/013891, dated Aug. 13, 2015, Applicant, Cree, Inc., (8 pages).
International Search Report and Written Opinion for International Application No. PCT/US14/30017, dated Aug. 1, 2014, Applicant, Cree, Inc., (21 pages).
International Search Report and Written Opinion for International Application No. PCT/US2014/072848, dated Mar. 25, 2015, Applicant, Cree, Inc., (17 pages).
IPRP for International Application No. PCT/US2014/013934, dated Aug. 13, 2015, Applicant, Cree, Inc., (11 pages).
IPRP for International Application No. PCT/US2014/013854, dated Aug. 13, 2015, Applicant, Cree, Inc., (9 pages).
IPRP for International Application No. PCT/US2014/013931, dated Aug. 13, 2015, Applicant, Cree, Inc., (15 pages).
IPRP for International Application No. PCT/US2014/013408, dated Aug. 13, 2015, Applicant, Cree, Inc., (15 pages).
U.S. Appl. No. 14/839,557, filed Aug. 28, 2015, Inventors, Wilcenski et al. (63 pages).
IPRP for International Application No. PCT/US2014/028887, dated Sep. 24, 2015, Applicant, Cree, Inc., (9 pages).
IPRP for International Application No. PCT/US2014/013400, dated Sep. 24, 2015, Applicant, Cree, Inc., (14 pages).
IPRP for International Application No. PCT/US2014/028938, dated Sep. 24, 2015, Applicant, Cree, Inc., (12 pages).
Non-final Office action dated Jul. 31, 2015, for U.S. Appl. No. 14/015,801, Applicant, Cree, Inc. (48 pages).
Non-final Office action dated Jun. 10, 2015, for U.S. Appl. No. 13/842,521, Applicant, Cree, Inc. (53 pages).
Non-final Office action dated Apr. 1, 2015, for U.S. Appl. No. 13/841,074, Applicant, Cree, Inc. (57 pages).
Final Office action dated Jun. 2, 2015, for U.S. Appl. No. 13/841,622, Applicant, Cree, Inc. (58 pages).
Non-final Office action dated Mar. 24, 2015, for U.S. Appl. No. 13/840,563, Applicant, Cree, Inc. (36 pages).

(56) References Cited

OTHER PUBLICATIONS

Final Office action dated Jun. 11, 2015, for U.S. Appl. No. 13/938,877, Applicant, Cree, Inc. (40 pages).
Non-final Office action dated Apr. 30, 2015, for U.S. Appl. No. 14/101,132, Applicant, Cree, Inc. (21 pages).
Non-final Office action dated Aug. 12, 2015, for U.S. Appl. No. 14/577,730, Applicant, Cree, Inc. (52 pages).
Non-final Office action dated May 20, 2015, for U.S. Appl. No. 14/101,051, Applicant, Cree, Inc. (17 pages).
Non-final Office action dated Feb. 27, 2015, for U.S. Appl. No. 14/292,778, Applicant, Cree, Inc. (10 pages).
Non-final Office action dated Sep. 4, 2015, for U.S. Appl. No. 14/101,132, Applicant, Cree, Inc. (48 pages).
Non-final Office action dated Aug. 31, 2015, for U.S. Appl. No. 14/292,778, Applicant, Cree, Inc. (49 pages).
Invitation to Pay Additional Fees for International Application No. PCT/US2015/032011 dated Aug. 6, 2015, Applicant, Cree, Inc. (2 pages).
Invitation to Pay Additional Fees for International Application No. PCT/US2015/020601 dated Jun. 5, 2015, Applicant, Cree, Inc. (2 pages).
Non-final Office action dated Jun. 30, 2015, for U.S. Appl. No. 14/583,415, Applicant, Cree, Inc. (216 pages).
International Search Report and Written Opinion for International Application No. PCT/US15/32050, Applicant, Cree, Inc., dated Oct. 19, 2015 (19 pages).
U.S. Appl. No. 15/450,578, Office Action, dated Aug. 9, 2018.

* cited by examiner

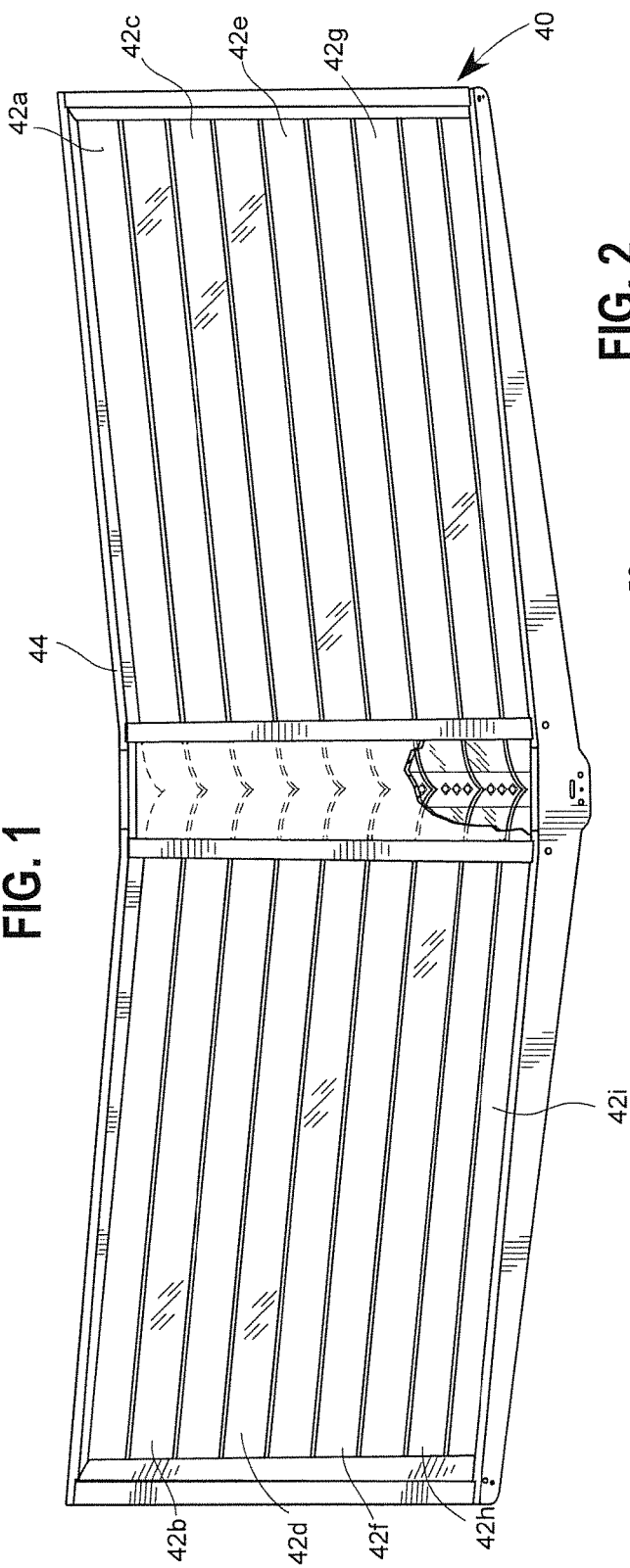
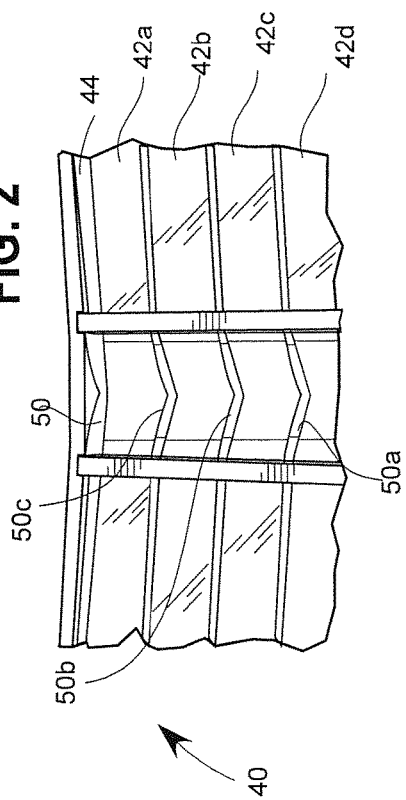

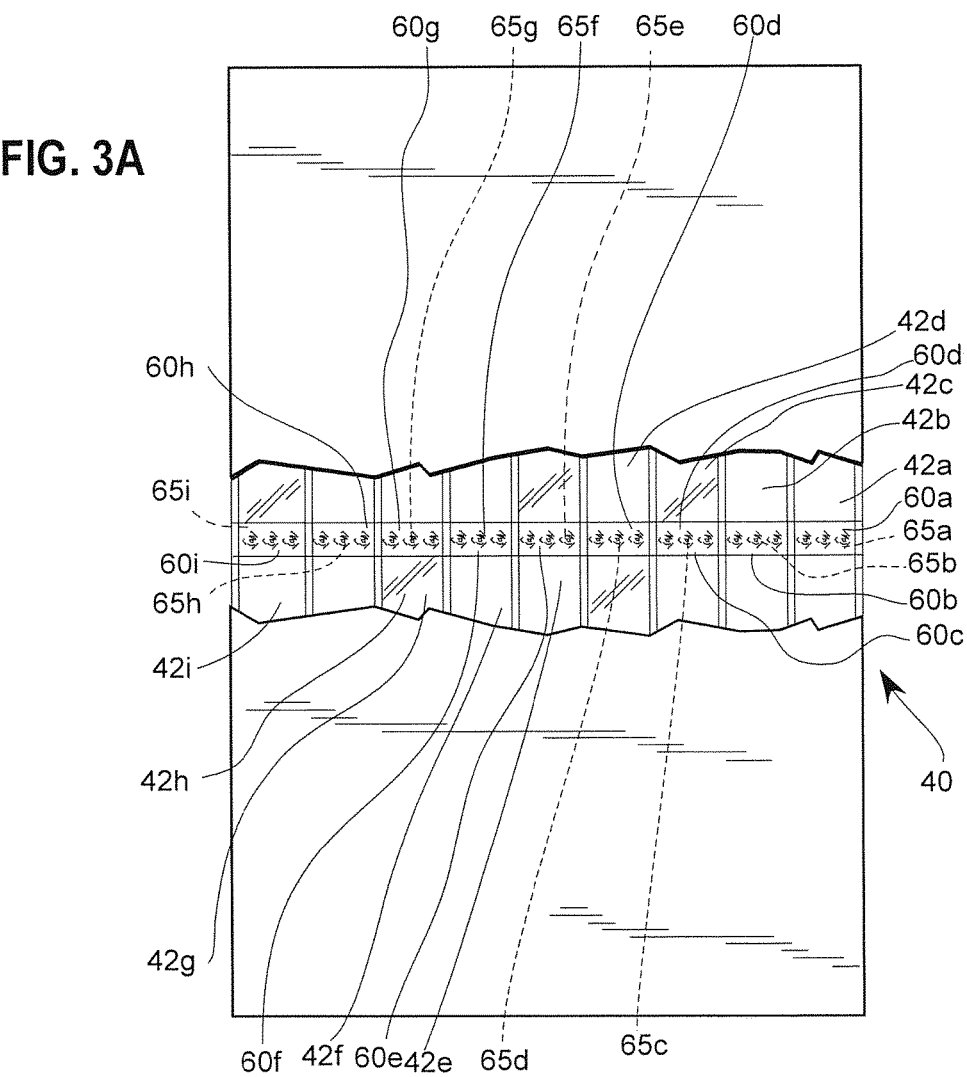

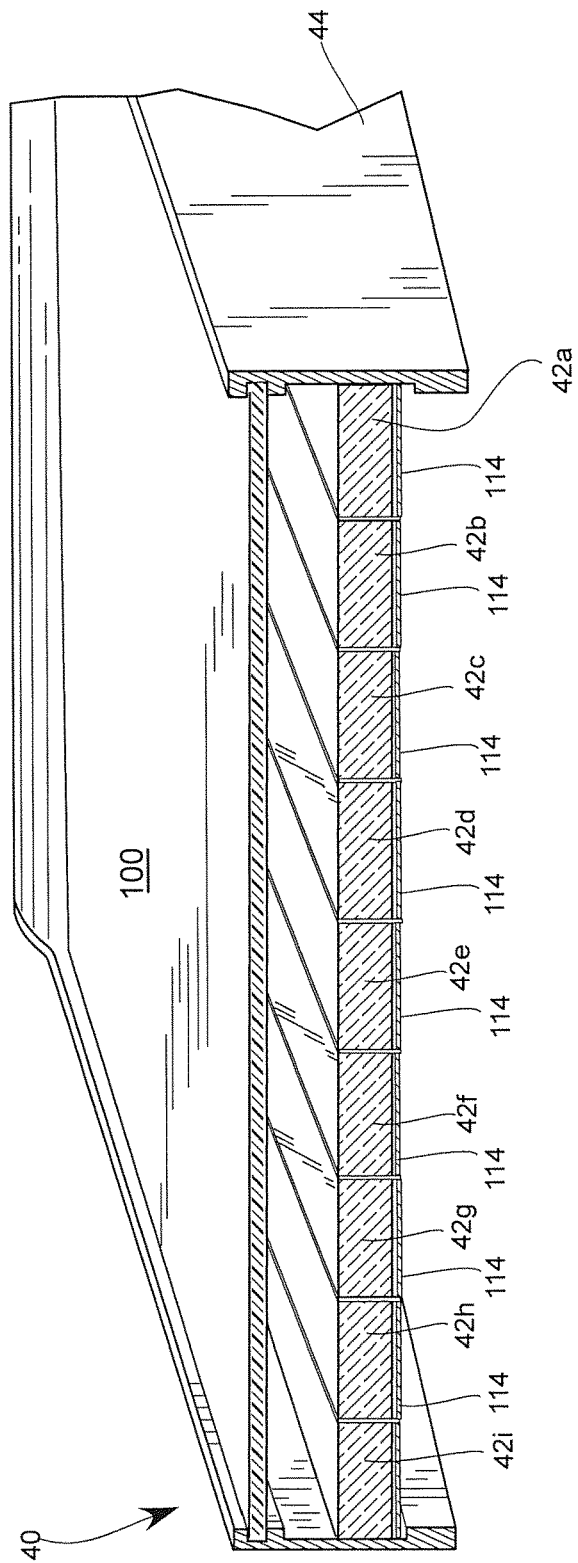

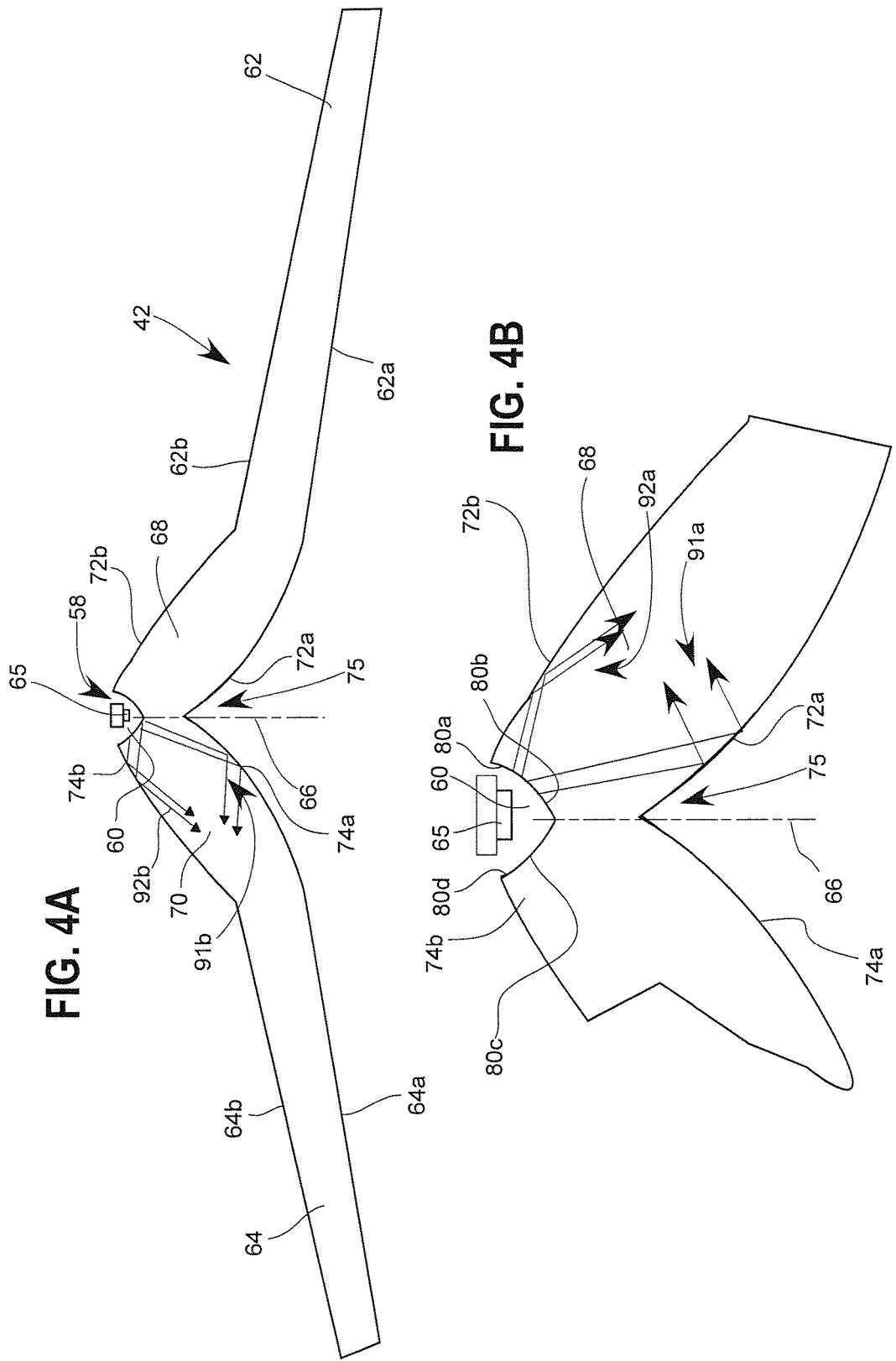

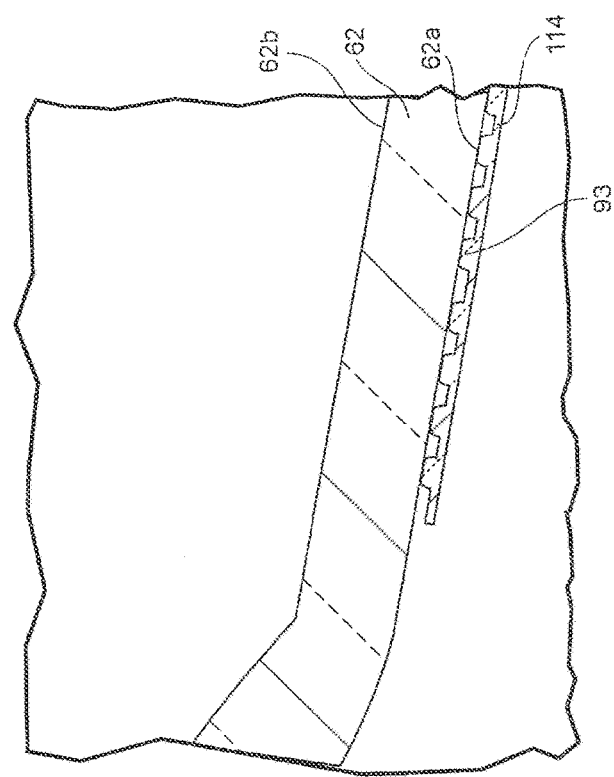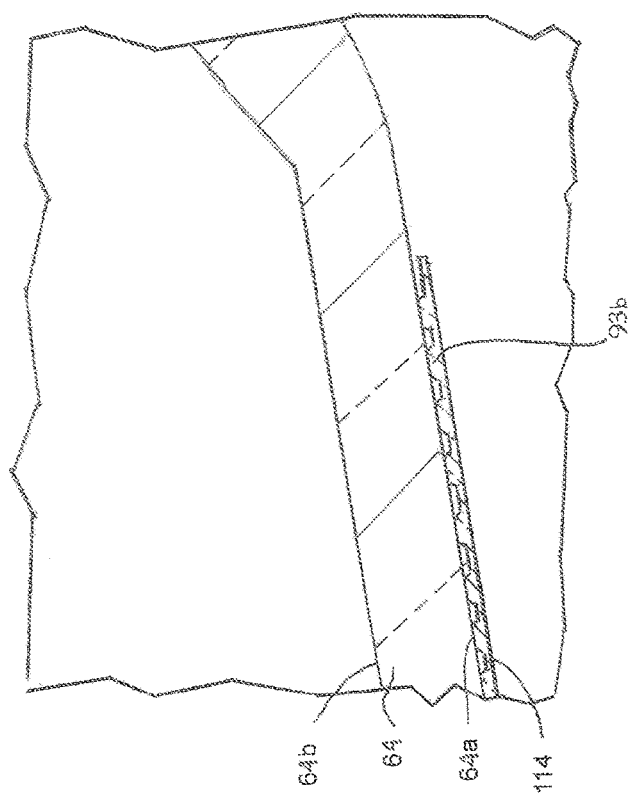
FIG. 23

LUMINAIRE WITH SELECTABLE LUMINOUS INTENSITY PATTERN

CROSS REFERENCE TO RELATED APPLICATIONS

The present application claims the benefit of U.S. Provisional Patent Application No. 61/922,017, filed Dec. 30, 2013, entitled "Optical Waveguide Bodies and Luminaires Utilizing Same" and U.S. Provisional Patent Application No. 62/020,866, filed Jul. 3, 2014, entitled "Luminaires Utilizing Edge Coupling". The present application further comprises a continuation-in-part of U.S. patent application Ser. No. 13/839,949, filed Mar. 15, 2013, entitled "Optical Waveguide and Lamp Including Same", and further comprises a continuation-in-part of U.S. patent application Ser. No. 13/840,563, filed Mar. 15, 2013, entitled "Optical Waveguide and Luminaire Incorporating Same", and further comprises a continuation-in-part of U.S. patent application Ser. No. 13/938,877, filed Jul. 10, 2013, entitled "Optical Waveguide and Luminaire Incorporating Same", and further comprises a continuation-in-part of U.S. patent application Ser. No. 14/101,086, filed Dec. 9, 2013, entitled "Optical Waveguides and Luminaires Incorporating Same", and further comprises a continuation-in-part of U.S. patent application Ser. No. 14/101,132, filed Dec. 9, 2013, entitled. "Waveguide Bodies Including Redirection Features and Methods of Producing Same", and further comprises a continuation-in-part of U.S. patent application Ser. No. 14/101,147, filed Dec. 9, 2013, entitled "Luminaires Using Waveguide Bodies and Optical Elements", and further comprises a continuation-in-part of U.S. patent application Ser. No. 14/101,129, filed Dec. 9, 2013, entitled "Simplified Low Profile Module With Light Guide For Pendant, Surface Mount, Wall Mount and Stand Alone Luminaires", and further comprises a continuation-in-part of U.S. patent application Ser. No. 14/101,051, filed Dec. 9, 2013, entitled "Optical Waveguide and Lamp including Same", and further comprises a continuation-in-part of International Application No. PCT/US14/13937, filed Jan. 30, 2014, entitled "Optical Waveguide Bodies and Luminaires Utilizing Same", and further comprises a continuation-in-part of International Application No. PCT/US14/13931, filed Jan. 30, 2014, entitled "Optical Waveguides and Luminaires Incorporating Same", all owned by the assignee of the present application, and the disclosures of which are incorporated by reference herein. This patent application incorporates by reference co-pending U.S. patent application Ser. No. 14/472,078, entitled "Waveguide Having Unidirectional Illuminance", filed Aug. 28, 2014, and U.S. patent application Ser. No. 14/472,035, entitled "Luminaires Utilizing Edge Coupling", filed Aug. 28, 2014, both owned by the assignee of the present application.

REFERENCE REGARDING FEDERALLY SPONSORED RESEARCH OR DEVELOPMENT

Not applicable

SEQUENTIAL LISTING

Not applicable

FIELD OF DISCLOSURE

The present subject matter relates to lighting devices, and more particularly, to a luminaire incorporating waveguides for general illumination.

BACKGROUND

An optical waveguide mixes and directs light emitted by one or more light sources, such as one or more light emitting diodes (LEDs). A typical optical waveguide includes three main components: one or more coupling elements, one or more distribution elements, and one or more extraction elements. The coupling component(s) direct light into the distribution element(s), and condition the light to interact with the subsequent components. The one or more distribution elements control how light flows through the waveguide and is dependent on the waveguide geometry and material. The extraction element(s) determine how light is removed by controlling where and in what direction the light exits the waveguide.

When designing a coupling optic, the primary considerations are: maximizing the efficiency of light transfer from the source into the waveguide; controlling the location of light injected into the waveguide; and controlling the angular distribution of the light in the coupling optic. One way of controlling the spatial and angular spread of injected light is by fitting each source with a dedicated lens. These lenses can be disposed with an air gap between the lens and the coupling optic, or may be manufactured from the same piece of material that defines the waveguide's distribution element(s). Discrete coupling optics allow numerous advantages such as higher efficiency coupling, controlled overlap of light flux from the sources, and angular control of how the injected light interacts with the remaining elements of the waveguide. Discrete coupling optics use refraction, total internal reflection, and surface or volume scattering to control the distribution of light injected into the waveguide.

After light has been coupled into the waveguide, it must be guided and conditioned to the locations of extraction. The simplest example is a fiber-optic cable, which is designed to transport light from one end of the cable to another with minimal loss in between. To achieve this, fiber optic cables are only gradually curved and sharp bends in the waveguide are avoided. In accordance with well-known principles of total internal reflectance light traveling through a waveguide is reflected back into the waveguide from an outer surface thereof, provided that the incident light does not exceed a critical angle with respect to the surface. Specifically, the light rays continue to travel through the waveguide until such rays strike an index interface surface at a particular angle less than an angle measured with respect to a line normal to the surface point at which the light rays are incident (or, equivalently, until the light rays exceed an angle measured with respect to a line tangent to the surface point at which the light rays are incident) and the light rays escape.

In order for an extraction element to remove light from the waveguide, the light must first contact the feature comprising the element. By appropriately shaping the waveguide surfaces, one can control the flow of light across the extraction feature(s) and thus influence both the position from which light is emitted and the angular distribution of the emitted light. Specifically, the design of the coupling and distribution surfaces, in combination with the spacing (distribution), shape, and other characteristic(s) of the extraction features provide control over the appearance of the waveguide (luminance), its resulting distribution of emitted light (illuminance), and system optical efficiency.

Hulse U.S. Pat. No. 5,812,714 discloses a waveguide bend element configured to change a direction of travel of light from a first direction to a second direction. The waveguide bend element includes a collector element that collects light emitted from a light source and directs the light into an input face of the waveguide bend element. Light entering the bend element is reflected internally along an outer surface and exits the element at an output face. The outer surface comprises beveled angular surfaces or a curved surface oriented such that most of the light entering the bend element is internally reflected until the light reaches the output face Parker et al. U.S. Pat. No. 5,613,751 discloses a light emitting panel assembly that comprises a transparent light emitting panel having a light input surface, a light transition area, and one or more light sources. Light sources are preferably embedded or bonded in the light transition area to eliminate any air gaps, thus reducing light loss and maximizing the emitted light. The light transition area may include reflective and/or refractive surfaces around and behind each light source to reflect and/or refract and focus the light more efficiently through the light transition area into the light input surface of the light-emitting panel. A pattern of light extracting deformities, or any change in the shape or geometry of the panel surface, and/or coating that causes a portion of the light to be emitted, may be provided on one or both sides of the panel members. A variable pattern of deformities may break up the light rays such that the internal angle of reflection of a portion of the light rays will be great enough to cause the light rays either to be emitted out of the panel or reflected back through the panel and emitted out of the other side.

Shipman, U.S. Pat. No. 3,532,871 discloses a combination running light reflector having two light sources, each of which, when illuminated, develops light that is directed onto a polished surface of a projection. The light is reflected onto a cone-shaped reflector. The light is transversely reflected into a main body and impinges on prisms that direct the light out of the main body.

Simon U.S. Pat. No. 5,897,201 discloses various embodiments of architectural lighting that is distributed from contained radially collimated light. A quasi-point source develops light that is collimated in a radially outward direction and exit means of distribution optics direct the collimated light out of the optics.

Kelly et al. U.S. Pat. No. 8,430,548 discloses light fixtures that use a variety of light sources, such as an incandescent bulb, a fluorescent tube and multiple LEDs. A volumetric diffuser controls the spatial luminance uniformity and angular spread of light from the light fixture. The volumetric diffuser includes one or more regions of volumetric light scattering particles. The volumetric diffuser may be used in conjunction with a waveguide to extract light.

Dau et al U.S. Pat. No. 8,506,112 discloses illumination, devices having multiple light emitting elements, such as LEDs disposed in a row. A collimating optical element receives light developed by the LEDs and a light guide directs the collimated light from the optical element to an optical extractor, which extracts the light.

A.L.P. Lighting Components, Inc. of Niles, Ill., manufactures a waveguide having a wedge shape with a thick end, a narrow end, and two main faces therebetween. Pyramid-shaped extraction features are formed on both main faces. The wedge waveguide is used as an exit sign such that the thick end of the sign is positioned adjacent a ceiling and the narrow end extends downwardly. Light enters the waveguide at the thick end and is directed down and away from the waveguide by the pyramid-shaped extraction features.

Low-profile LED-based luminaires have recently been developed (e.g., General Electric's ET series panel troffers) that utilize a string of LED components directed into the edge of a waveguiding element (an "edge-lit" approach).

However, such luminaires typically suffer from Fow efficiency due to losses inherent in coupling light emitted from a predominantly Lambertian emitting source such as a LED component into the narrow edge of a waveguide plane.

Smith U.S. Pat. Nos. 7,083,313 and 7,520,650 disclose a light direction device for use with LEDs. In one embodiment, the light direction device includes a plurality of opposing collimators disposed about a plurality of LEDs on one side of the device. Each collimator collimates light developed by the LEDs and directs the collimated light through output surfaces of the collimators toward angled reflectors disposed on a second side opposite the first side of the device. The collimated light reflects off the reflectors out of and out of the device from the one side perpendicular thereto. In another embodiment, the collimators are integral with a waveguide having reflective surfaces disposed on a second side of the waveguide, and the collimated light is directed toward the reflective surfaces. The light incident on the reflective surfaces is directed from the one side of the device, as in the one embodiment.

Dau et al. U.S. Pat. No. 8,410,726 discloses a lamp for use in an Edison-type screw-in connector. The lamp includes a plurality of LED modules oriented radially within a base. In one embodiment, each LED module has a wedge shape. LEDs located near the base of the module emit light into a light guiding and extracting wedge. Surface extraction features are introduced into the wedge to extract light. A user can operate the light with different combinations of modules to generate a desired light output from the lamp.

Summerford et al. U.S. Pat. No. 8,547,022 discloses a lighting control system having a primary high intensity discharge light source and a secondary LED light source. Power is routed to either the primary or the secondary light source by a common power source.

Beeson et al. U.S. Pat. No. 5,396,350 teaches a backlighting apparatus used for flat panel electronic displays. The apparatus includes a slab waveguide that receives light from a light source positioned adjacent a side surface thereof and an array of microprisms attached to a face of the waveguide. Each microprism has a side surface tilted at an angle from the direction normal to the surface of the waveguide. Light emitted from the microprisms is substantially perpendicular to the slab waveguide.

Zimmerman et al. U.S. Pat. No. 5,598,281 discloses a backlight assembly for electro-optical displays. Light emitted from a light source disposed within a reflector travels through an array of apertures and is collimated by an array of tapered optical elements aligned with the array of apertures. Microlenses may be disposed adjacent the optical elements to further collimate the light. The surfaces of the optical elements are planar or parabolic in shape.

Zimmerman et al. U.S. Pat. No. 5,428,468 teaches an optical illumination system for applications that require substantially collimated light. The system comprises a waveguide that receives light at an edge thereof. An array of microprisms is attached to one face of the waveguide. Each microprism has at least two sidewalls tilted at an angle from the normal of the surface of the waveguide. An array of microlenses may be disposed atop the array of microprisms to further collimate the light.

Steiner et al. U.S. Pat. No. 5,949,933 discloses an optical illumination system for collimating light. The system includes a waveguide that receives light at an edge thereof and an array of lenticular microprisms attached to one face of the waveguide. Each microprism has a light input surface optically coupled to the waveguide and a light output surface opposite the input surface. The light input surface includes a number of tapered grooves perpendicular to the length of the lenticular microprism. The system also includes an array of microlenses to further collimate the light.

Hou et al. U.S. Pat. No. 5,839,823 teaches an illumination system including a light source adjacent to or housed within a reflector. A light-directing assembly having at least one microprism carried on a base wall is positioned adjacent the light source opposite the reflector. The microprism may be polyhedronal, curvilinear, and polyhedronal curvilinear. A lens array may be disposed on the other side of the base wall.

Kuper et al. U.S. Pat. No. 5,761,355 discloses a light directing optical structure comprising a waveguide having a multiplicity of prisms attached thereto. Light redirected by the prisms is constrained to a range of angles. The side face(s) of the prisms may be planar or curved. An array of lenses may be used to spread the light output of the prisms to a wider distribution angle.

SUMMARY

According to one aspect, a luminaire comprises at least one waveguide having a first region that emits a first luminous intensity pattern and a second region that emits a second luminous intensity pattern different from the first luminous intensity pattern. The luminaire further includes a plurality of LED elements and circuitry to control the plurality of LED elements to cause the luminaire to produce a selected one of a plurality of luminous intensity patterns.

According to another aspect, a luminaire includes a plurality of waveguides each having a light emission surface and a plurality of extraction features. The plurality of light extraction features are disposed on the light emission surfaces of the waveguides. The extraction features on at least one of the light emission surfaces have a different light extraction characteristic than the extraction features on at least another of the light emission surfaces. The luminaire further comprises a plurality of LEDs associated with the plurality of waveguides and circuitry adapted to apply electrical power to at least some of the LEDs of the plurality of LEDs to cause the luminaire to produce a selected one of a plurality of luminous intensity patterns.

According to yet another aspect, a luminaire comprises multiple waveguides each having two light emission surfaces and a light coupling feature and wherein the waveguides have substantially identical shapes. A mounting apparatus maintains the multiple waveguides in a side-by-side array wherein each waveguide is disposed adjacent at least one other waveguide. An optical isolation member is disposed between adjacent waveguides. Extraction features are disposed on each light emission surface of the waveguides. The extraction features comprise protrusions and are carried by associated substrate portions and disposed between an associated light emission surface and the associated substrate portion. The protrusions associated with one of the light emission surfaces has a first light extraction characteristic and the protrusions associated with another of the light emission surfaces has a second light extraction characteristic different than the first light extraction characteristic. LEDs are optically coupled to an optical coupling feature of each waveguide. Circuitry is adapted to apply electrical power to at least some of the LEDs to cause the luminaire to produce a selected one of a number of luminous intensity patterns.

Other aspects and advantages will become apparent upon consideration of the following detailed description and the attached drawings wherein like numerals designate like structures throughout the specification.

BRIEF DESCRIPTION OF THE DRAWINGS

FIG. 1 is an isometric view of an embodiment of a luminaire shown from below;

FIG. 2 is an enlarged fragmentary view of the luminaire of FIG. 1;

FIG. 4 is a second sectional isometric view.

FIG. 3A is a plan view of the luminaire of FIG. 1 with central portions broken away to show LED elements or modules therein;

FIG. 4A is a side elevational view of one of the waveguides of FIG. 1;

FIG. 4B is a fragmentary enlarged side elevational view illustrating the waveguide of FIG. 4A in greater detail;

FIG. 23 is a view similar to F 5 showing a portion of a waveguide with different regions where the extraction features a of different heights.

DETAILED DESCRIPTION

Figure 3:
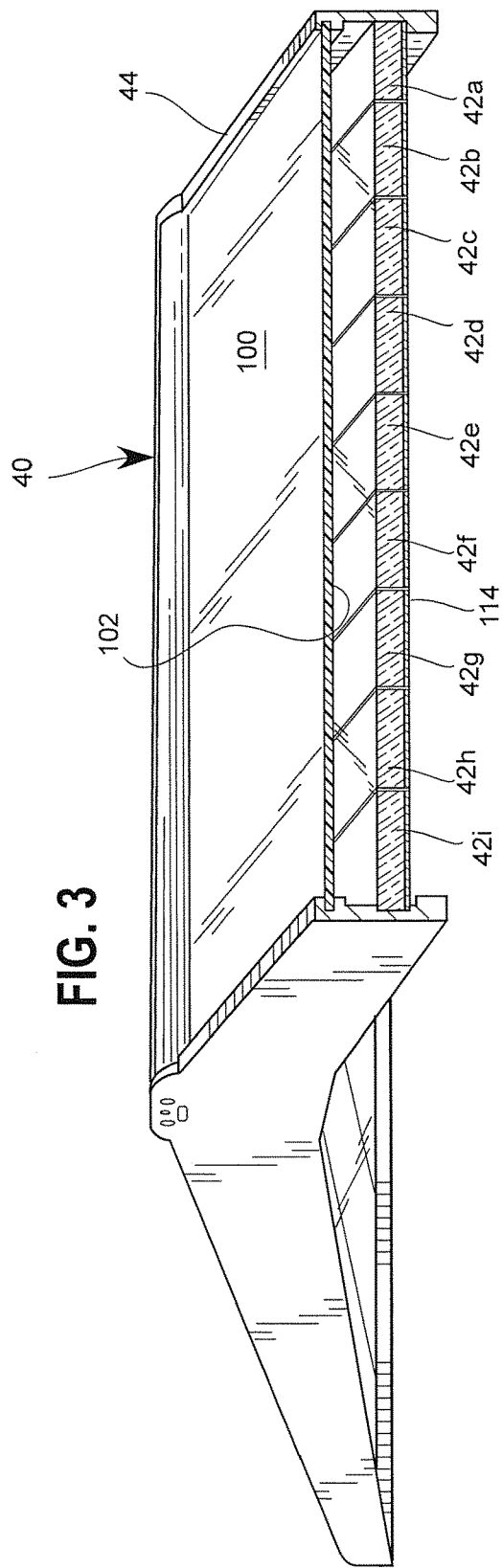
FIG. 3 is a first sectional isometric views of the luminaire of FIG. 1.

Referring to FIGS. 1-4, a luminaire 40 includes a plurality of waveguides 42a, 42b, . . . , 42N that are, in the illustrated embodiment, assembled together in fixed relationship by a frame or other holding or mounting apparatus 44. While these figures illustrate a specific waveguide geometry and coupling approach, the overall concept of the invention may also be achieved using a variety of waveguide geometries and coupling approaches, including standard state-of-the-art flat (planar) waveguides with edge or center coupling.

In the specific illustrated embodiment, the multiple waveguides 42a, 42b, . . . , 42N are maintained in a side-by-side array wherein each waveguide 42 is disposed adjacent at least one other waveguide 42. If desired, optional optical isolation members in the form of reflective barriers 50a, 50b, . . . , 50N–1 (FIG. 2) may be disposed between some or all adjacent waveguides 42. Each reflective barrier 50 may comprise a specular or white reflective member or film that extends partially or completely between adjacent waveguides 42 so that the adjacent waveguides are partially or fully optically isolated, respectively, with respect to one another. Further reflective barriers 50 may be disposed between outer waveguides 42a, 42N and the mounting apparatus 44, if desired.

Referring also to FIG. 4A, each waveguide 42 may have any suitable shape, and the shapes of the waveguides may be different from one another or substantially identical. For example, a first subset less than all of the waveguides 42 may be substantially identical to one another, and some or all of the remaining waveguides 42 comprising a second subset may be different than the waveguides of the first subset. In this latter case, the waveguides of the second subset may be substantially identical to each other or some or all may be different from one another. Any combination of substantially identical and/or different waveguides 42 is contemplated. Also, although nine waveguides 42 are illustrated in the FIGS., a different number of waveguides could be used.

In the illustrated embodiment the waveguides 42 are all substantially identical to one another, with the exceptions noted hereinafter. As seen in FIG. 4A, each waveguide 42 includes an input portion 58 having a light coupling feature in the form of a cavity 60 disposed between two outwardly extending arm portions 62, 64. One or more LED elements or modules 65 are disposed in or adjacent each cavity 60. The arm portions 62, 64 are preferably mirror images of one another about an axis of symmetry 66 coincident with a center line of the light coupling cavity 60. Also preferably, each arm portion 62, 64 is tapered, and the arm portions 62, 64 are disposed at an included angle therebetween. The arm portions 62, 64 may be disposed at any included angle and each waveguide 42 may have the shape and size (including dimensions), for example, as shown in International Application No. PCT/US14/13937, filed Jan. 30, 2014, entitled "Optical Waveguide Bodies and Luminaires Utilizing Same", incorporated by reference herein. In the illustrated embodiment the included angle is equal to about 160 degrees such that each waveguide disposed with an angle of about 10 degrees relative to horizontal. In alternative embodiments, the luminaire may include more than one waveguide and may utilize interior-lit coupling, multiple-edge coupling, or a combination thereof. One example of multiple-edge coupling is described in co-pending U.S. patent application Ser. No. 14/472,035, filed Aug. 28, 2014, entitled "Luminaire Utilizing Multiple Edge Coupling", incorporated herein by reference. The type of coupling may influence the angular and spatial distribution of light within the waveguide, which in turn, can influence the efficiency of extraction, the illuminance, and the luminance.

Each LED element or module 65 may be a single white or other color LED chip or other bare component, or each may comprise multiple LEDs either mounted, separately or together on a single substrate or package to form a module including, for example, at least one phosphor-coated LED either alone or in combination with at least one color LED, such as a green LED, a yellow LED, a red LED, etc. In those cases where a soft white illumination with improved color rendering is to be produced, each LED element or module 65 or a plurality of such elements or modules may include one or more blue shifted yellow LEDs and one or more red LEDs. The LEDs may be disposed in different configurations and/or layouts as desired. Different color temperatures and appearances could be produced using other LED combinations, as is known in the art. The luminaire may include LEDs 65 of the same type of phosphor-converted white LED, or any combination of the same or different types of LEDs discussed herein. In some embodiments, a luminaire may include a plurality of groups of LEDs 65, where each group may include LEDs 65 having different colors and/or color temperatures. The groups of LEDs 65 may be separated by dividers, as described in U.S. patent application Ser. No. 14/472,035, filed Aug. 28, 2014, entitled "Luminaire Utilizing Multiple Edge Coupling", incorporated herein by reference, wherein the LEDs 65 are disposed within the coupling cavity. Such dividers facilitate the mixing of light between adjacent LEDs 65, limit the angle of incidence of light incident on coupling surfaces 80a-80d defining a coupling cavity 60 of the waveguide 42, and reduce interaction and light absorption between LED components 65. In embodiments having LEDs of the same or similar color, dividers may not be necessary or desired. Further, in one embodiment, the light source comprises any LED, for example, an MT-G LED incorporating TrueWhite® LED technology or as disclosed in U.S. patent application Ser. No. 13/649,067, filed Oct. 10, 2012, entitled "LED Package with Multiple Element Light Source and Encapsulant Having Planar Surfaces" by Lowes et al., the disclosure of which is hereby incorporated by reference herein, as developed and manufactured by Cree, Inc., the assignee of the present application. If desirable, a side emitting LED disclosed in U.S. Pat. No. 8,541,795, the disclosure of which is incorporated by reference herein, may be utilized inside the waveguide body. In some embodiments, each LED element or module 65 may comprise one or more LEDs disposed vertically within the coupling cavity. In any of the embodiments disclosed herein the LED element(s) or module(s) 65 preferably have a Lambertian or near-Lambertian light distribution, although each may have a directional emission distribution (e.g., a side emitting distribution), as necessary or desirable. More generally, any lambertian, symmetric, wide angle, preferential-sided, or asymmetric beam pattern LED(s) may be used as the light source.

The input portion 58 includes two control sections 68, 70 that are preferably, although not necessarily, mirror images of one another about the axis of symmetry 66. Each control section 68, 70 includes at least one control surface 72, 74, respectively. Referring specifically to FIG. 4B, which illustrates the control section 68 in greater detail, first and second opposed control surfaces 72a, 72b are disposed in spaced relationship with respect to the light coupling cavity 60. The control section 70 includes corresponding opposed control surfaces 74a, 74b and the control surfaces 72a, 74a together define a curved V-shaped surface 75. If desired, the V-shaped surface 75 may have a specular or other reflective coating or member disposed thereon. The light coupling cavity 60 is defined by first, second, third, and fourth surfaces 80a-80d. The surfaces 80a-80d and the control surfaces 72, 74 are designed to cause light developed by the one or more LED elements or modules 65 disposed in or adjacent the light coupling cavity 60 to be redirected into two groups or sets of light rays each of which travels within a range of ray angles through each arm portion 62, 64.

Specifically, and with reference to FIGS. 4A and 4B, the primarily lambertian distribution of light developed by the LED elements or modules 65 is incident on the surfaces 80a-80d defining the cavity 60, and light incident on the second and third surfaces 80b, 80c travels through the input portion 58 and strikes the curved V-shaped surface 75. The control surfaces 72a, 74a redirect the light by TIR (and/or specular reflection if the coating or member 76 is present) into the arm portions 62, 64 as first sets of ray groups 91a, 91b that bounce due to total internal reflection between first and second surfaces 62a, 62b of the arm portion 62 and first and second surfaces 64a, 64b of the arm portion 64, respectively. According to well-known TIR principles, the light rays of the groups 91a, 91b continue to travel through the arm portions 62, 64, respectively, until such rays strike an index interface surface at a particular angle less than an angle measured with respect to a line normal to the surface point at which the light ray is incident or, equivalently, until the light rays exceed an angle measured with respect to a line tangent to the surface point at which the light ray is incident, and the light rays escape.

Light incident on the first and fourth surfaces 80a, 80d of the cavity 60 travels through the input portion 58 without striking the curved V-shaped surface 75. In the embodiment of FIGS. 4A and 4B, at least some of the light incident on the surfaces 80a, 80d is further incident on the second control surfaces 72b, 74b and such surfaces are curved in a manner that causes the light to be redirected into second sets of ray groups 92a, 92b. This light also bounces between the first surfaces 62a, 64a and the second surfaces 64a, 64b until such rays escape the arm portions 62, 64. In the illustrated embodiment, the ray groups 91a, 91b, 92a, and 92b have narrow ray angle distributions (i.e., the ray groups are substantially or fully collimated). In some embodiments, the control surfaces 72, 74 may be partially or fully parabolic in shape and centered on the LED elements or modules 65. One or more extraction features 93 (FIGS. 5-10) disposed on any or all of the surfaces 62a, 62b, 64a, 64b cause the light to exit the waveguide 42 in a controlled fashion such that light is directed out of the first and/or second surfaces 62a, 62b, 64a, 64b, as noted in greater detail hereinafter. Because the light rays are at least substantially collimated they experience minimal spreading as they propagate through the arm portions 62, 64. This results in highly controlled beams that can be either extracted in a collimated fashion, or spread into a wide distribution, as also described in greater detail hereinbelow.

If desired, a light reflective backplane member 100 (FIG. 3) may be disposed above the waveguides 42. The backplane member 100 may comprise a part of the frame or other holding or mounting apparatus 44 or may be separate therefrom. The member 100 may include a surface 102 adjacent the surfaces 62h, 64b that has a white or specular reflective coating or other member secured or otherwise applied thereto. Light exiting the surfaces 62b, 64b of one of the waveguides 42a, 42b, . . . , 42N is reflected off the surface 102 and re-directed downward through the same waveguide 42 (and/or any of the other waveguides 42) so that the light contributes to the luminous intensity distribution of the luminaire.

Figure 5:
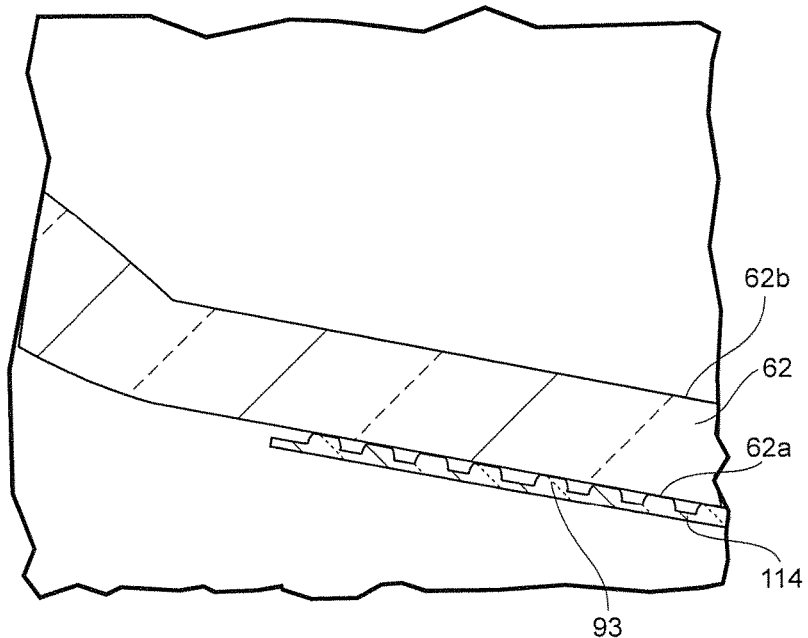
FIG. 5 is an enlarged fragmentary elevational view of one of the waveguides of FIG. 1.
Figure 6:
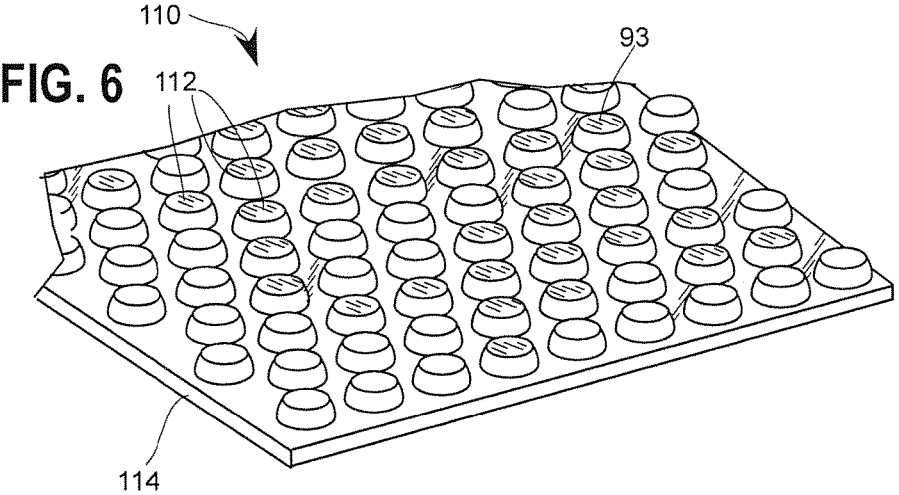
FIG. 6 is a fragmentary isometric view of the light extraction features of FIG. 5 disposed on a substrate.

With reference to FIG. 5, in the illustrated embodiment, each waveguide 42 includes a plurality of light extraction features 93 disposed on light emission surfaces comprising the surfaces 62a, 64a. In other embodiments, one or more waveguides of the luminaire may include one or more light emission surfaces including light extraction features thereon. Also referring to FIG. 6, the plurality of light extraction features 93 comprises an array 110 of regularly-spaced features 112, although it should be noted that the light extraction features may be irregularly spaced or some may be regularly spaced and others irregularly spaced, etc. In the illustrated embodiment, the light extraction features 93 are disposed in a hexagonal array and are disposed on a substrate 114, which may be a planar member, such as a film, a plate, a block or material, or the like. Further in the illustrated embodiment, the light extraction features 93 comprise protrusions carried by a film wherein the protrusions are disposed between the film and the light emission surfaces 62a, 64a.

The substrate 114 having features 93 disposed thereon may be fabricated using one of a variety of techniques typically applied to the formation of micro-optical films, including gray-scale lithography, micro-replication, injection/compression molding, reactive ion etching, chemical embossing, or drum roll transfer. Other methods of fabrication include dispensing an acrylic-based UV resin or silicone material on a carrier film that is subsequently cured to form extraction features.

In some embodiments, the extraction features 93 may be disposed on the waveguide 42 without a substrate 114. For example, the extraction features 93 may be fabricated directly on the first surfaces 62a, 64a of the waveguide 42 by means of an intermediate patterning layer as described in U.S. Pat. No. 8,564,004, issued Oct. 22, 2013, entitled "Complex Primary Optics with Intermediate Elements" by Tarsa et al., incorporated by reference herein. Using this method of manufacture, the extraction features 93 are optically joined to the waveguide 42 without the need for the substrate 114. The patterning layer may be used with any method such as molding, injection molding, compression molding, dispensing, stencil printing, three-dimensional printing, photolithography, deposition, or the like. Specifically, the patterning layer is formed on the first surfaces 62a, 64a of the waveguide 42 and includes holes or openings where the waveguide 42 is exposed. The openings of the patterning layer correspond to locations where the extraction features 93 are to be formed on the waveguide 42. In some embodiments, a mold is then placed over the patterning layer and first surfaces 62a, 64a of the waveguide 42. The mold includes voids that are aligned with the openings of the patterning layer to define cavities. The cavities are filled with the material of the extraction features. In other embodiments, the material of the extraction features is applied to the openings of the patterning layer prior to placement of the mold on the patterning layer. In either case, the material of the extraction feature is then at least partially cured and the mold is removed. The material of the patterning layer may comprise polyvinyl alcohol, a poly(methyl methacrylate) (PMMA) one or more photoresist materials, or other suitable materials. The patterning layer may be removed by a water rinse, heat, vaporization, machining, developers and solvents, chemical etching/solvent, plasma etching, or any method that does not interfere with the material of the waveguide 42 and/or extraction features 93. Alternatively, the waveguide 42, the extraction features 93, and/or the substrate 114 may be bonded to one another through one or more supplemental layers such as an adhesive layer or pressure-sensitive adhesive film.

The light extraction features 93 may be of the same material as the substrate 114 and/or the waveguide 42, or the materials of the features 93, the substrate 114, and/or the waveguide 42 may be different. In any event, the material(s) of the features 93 and the substrate 114, as well as the waveguides 42, preferably comprise optical grade materials that exhibit TIR characteristics including, but not limited to, one or more of acrylic, air, polycarbonate, molded silicone, glass, and/or cyclic olefin copolymers, and combinations thereof, possibly in a layered arrangement, to achieve a desired effect and/or appearance. Preferably, although not necessarily, the features 93 are all solid or some or all have one or more voids or discrete bodies of differing materials therein. Still further, the features 93 are preferably (although not necessarily) of substantially the same size (except, perhaps height extending from the substrate 114) and preferably (but not necessarily) have substantially the same shape.

Figure 7:
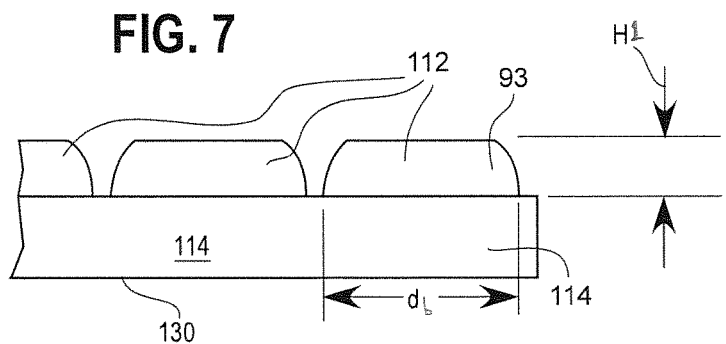
FIG. 7 is an enlarged fragmentary side elevational view of the light extraction features and substrate of FIG. 6.

Examples of illuminance distributions 95A-95K produced by each waveguide 42 are shown in FIGS. 11-17. The illuminance distributions 95A-95K are dependent upon the particular geometry and arrangement of extraction features 93. The features 93 may have a truncated hemispherical shape, although other shapes and/or sizes are possible. Referring to FIG. 7, the base diameter db of the extraction feature 93 may be approximately twice a height H. The height H may vary in turn to vary the desired illuminance distribution as described below. Further, a wide range of geometries could be used for the various waveguides to produce a wide variety of patterns. For example, the geometries illustrated in FIGS. 8A-8C, 9A, 9B, and 10A-10C are particularly useful in extracting light out of the first surfaces 62a, 64a of the waveguide 42, thereby minimizing the amount of light emitted from the second surfaces 62b, 64b thereof. Such unidirectional illuminance minimizes reflection and losses, and may eliminate the need for the light reflective backplane member 100. Further, additional embodiments may utilize geometries, spacings, methods of manufacture, and any other details related to the extraction features as described in U.S. patent application Ser. No. 14/472,078, entitled "Waveguide Having Unidirectional Illuminance", filed Aug. 28, 2014, the disclosure of which is incorporated by reference herein.

Figure 8A:
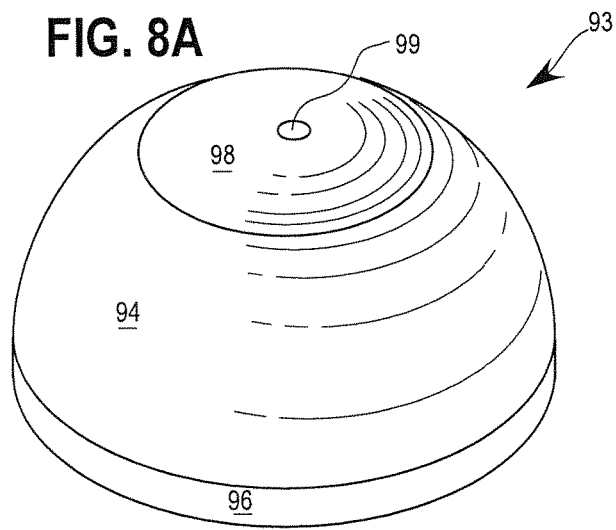
FIGS. 8A-8C are isometric, plan, and side elevational views, respectively, of a further embodiment of a light extraction feature.
Figure 8B:
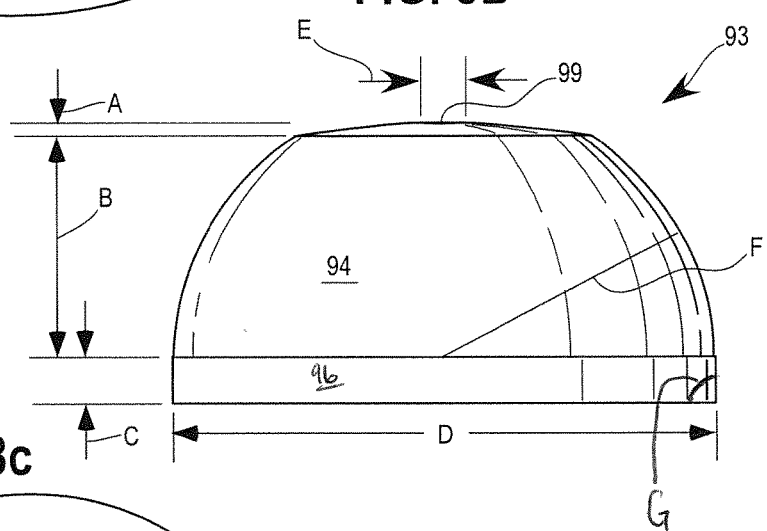
Figure 8C:
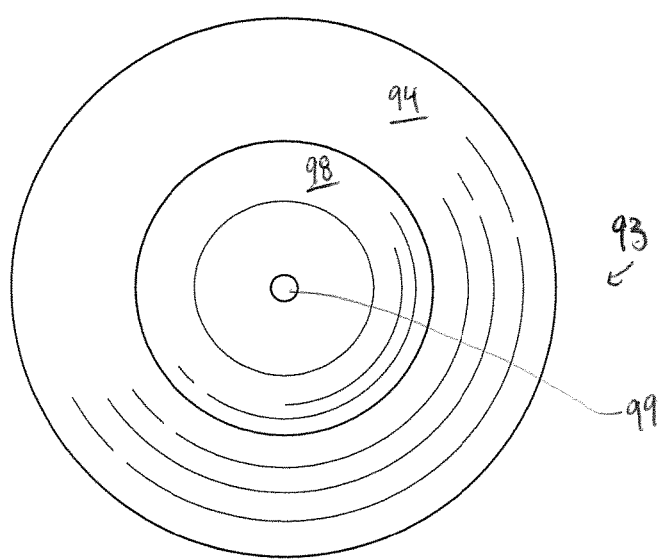

Another geometry which is particularly useful for a range of lighting applications includes a roughly "bullet shaped" profile as illustrated in FIGS. 8A-8C, consisting of a truncated curved surface 94 such as a truncated hemisphere with an adjacent cylindrical or conical base 96. This particular geometry provides a high degree of directionality as well as a range of possible illuminance distributions that may be realized by changing the height at which the curved surface is truncated. The height A of the hemispherical portion 94 affects the distribution of the light illumination of each waveguide 42 while the height C of the base 96 affects the percentage of light emitted downwardly relative to upward emitted light. If desired, a bonding feature 98 having a central planar portion 99 may be formed atop the truncated hemispherical portion 94. In some embodiments, the bonding feature 98 facilitates fabrication by enabling the bond between the feature 93 and the waveguide surfaces 62a, 64a to be free of air pocket(s) that may otherwise form. The bonding feature 98 of each extraction feature is bonded, laminated, or otherwise optically coupled to the light emission surfaces 62a, 64a such that the bonding feature 98 is embedded in the interposing adhering layer and results in a planar bond between the extraction feature 93 and the waveguide surfaces 62a, 64a, as depicted in FIG. 5. Example dimensions of one embodiment of the feature 93 are provided in Table 1.

TABLE 1

| | |
|---|---|
| A | 0.025 mm |
| B | 0.415 mm |

TABLE 1-continued

| | |
|---|---|
| C | 0.085 mm |
| D | 1.0 mm |
| E | 0.050 mm |
| F | 0.510 mm radius of curvature |
| G | 89 degrees |

In this regard, it is generally contemplated that at least one of the waveguides 42 has a first set of features 93 disposed thereon that are all substantially of the same first height H1 wherein at least one other waveguide 42 has a second set of features 93 disposed thereon that are all substantially of the same second height H2 different than the first height H1. However, it is possible to have at least one waveguide 42 having features 93 disposed thereon of differing heights. For example, the features 93a of the surface 62a or a first region of waveguide 42 may have a different height than the features 93b of the surface 64a or a second region of the same waveguide 42 (see FIG. 23). More particularly, referring to FIG. 7, the heights of the features 93 associated with each waveguide 42 preferably are in a range between about 10 μm and about 590 μm, and more preferably are in a range between about 100 μm and about 570 μm, and most preferably are in a range between about 279 μm and about 550 μm. Further, in embodiments where the center-to-center spacings of the features 93 vary across with the waveguide 42, the center-to-center spacings preferably are in a range between about 1.2 mm and about 20 mm, and more preferably are in a range between about 1.2 mm and about 10 mm, and most preferably are in a range between about 1.25 mm and about 5 mm. In embodiments where the center-to-center spacings of the features 93 have uniform spacing across with the waveguide 42, the center-to-center spacings may range from about 1.2 mm to about 2 mm, preferably about 1.25 mm. Still further, the maximum side-to-side dimensions of the features 93 (e.g., the diameter $d_b$ in FIG. 7) associated with each waveguide 42 preferably are in a range between about 0.1 micron and about 10 mm, and more preferably are in a range between about 1 micron and about 5 mm, and most preferably are in a range between about 10 microns and about 2 mm. Still further, the minimum distances between adjacent features 93 preferably are in a range between about 0.1 microns and about 20 mm, and more preferably are in a range between about 1 micron and about 5 mm, and most preferably are in a range between about 10 microns and about 1 mm.

Further example extraction features 116 are illustrated in FIGS. 9A, 9B, 10A, and 10C. Each extraction feature 116 includes a body 118 having a curved shape that extends between an aperture 120 adjacent the first surfaces 62a, 64a (FIG. 5) of the waveguide 42 and a base 122 opposite the aperture 120. The aperture 120 and the base 122 may be parallel or disposed at an angle relative to one another, as may be desired for a specialized asymmetric distribution. As in the embodiment shown in FIG. 5, the body 118 is undercut relative to the first surfaces 62a, 64a of the waveguide 54. The body 118 may include planar surfaces, curved surfaces, planar surfaces approximating one or more curved surfaces, or a combination thereof. The cross sectional outer profile of the body 118 may be symmetric in nature (e.g., as in the case of a hemisphere) or asymmetric (e.g., as in the case of an ellipse or other combination of shapes when viewed from above or below). The extraction features 116 and/or waveguide 42 may be acrylic, including an acrylic UV-curable resin, silicone, polycarbonate, glass, or other suitable material(s) and combinations thereof, possibly in a layered arrangement, to achieve a desired effect.

The body 118 may include a first portion 124 adjacent the aperture 120 and a second portion 126 adjacent the base 122. In some embodiments, the first portion 124 may be designed to redirect incident light downward through total internal reflection (TIR). A shape of the extraction feature 116 may be determined by iteratively plotting the points defining an outer surface of the shape using a differential or quasi-differential equation. One iterative process includes the steps of defining a start point at coordinates r, h, calculating a slope necessary to achieve total internal reflection for all light rays entering the extraction feature, and, based on the calculated slope, further calculating the necessary incremental radial step Δr that corresponds to a predetermined incremental height change Δh, moving to a new point r+Δr and h+Δh, and repeating the calculation and moving steps until the desired total height is reached. In other embodiments, the outer surfaces 124, 132 may be designed using geometric and/or differential equation (s) in combination with other curved, planar, and/or piecewise linear surfaces.

An example of the foregoing iterative process includes the use of Equations 1 and 2 below that are entered into an optimization routine such as Solver by Microsoft Excel®. Generally, a profile of the extraction feature 116 is defined by calculating a series of slopes dh/dR at incremental points 202a, 202b, . . . , 202N along an outer surface 128 of the first portion 124 of the extraction feature 116. The outer surface 128 is then rotated about a central axis 200 to define the extraction feature 116.

$$\varphi = \mathrm{ArcTan}\left(\frac{h}{R + R_o}\right) \quad \text{Equation 1}$$

$$\mathrm{Slope} = \frac{dh}{dR} = \tan(\varphi + \alpha) \quad \text{Equation 2}$$

In Equation 1, the sharpest angle of φ ray of light striking a given point, for example, 202d on the outer surface 128 is determined. As seen in FIG. 10C, the sharpest angle φ is defined by a light ray 204 entering the aperture 120 at an edge 206 thereof opposite to the point 202d, and is measured relative to a surface normal 208 of the aperture 120. The angle φ is calculated based on the coordinates of the point 202d relative to the entry of the light ray 204 into the extraction feature 116 at the edge 206 of the aperture 120. Specifically, the point 202d has a y-coordinate value h relative to the respective waveguide surface 62a, 64a and an x-coordinate value $R_o$+R, where $R_o$ is a distance from the edge 206 to the central axis 200 (i.e., an aperture radius) and R is a distance from the central axis 200 to the point 202d.

Using Equation 2, the slope dh/dR at the point 202d along the outer surface 128 is then calculated. Equation 2 ensures that the resultant incident angle δ relative to a surface normal 210 at point 202d exceeds the critical angle θ relative to the surface normal 210. As shown in FIG. 10C, the angle is the angle complementary to the critical angle θ. In the illustrated example, the resultant incident angle δ of the light ray 204 is approximately the same as or greater than the critical angle θ such that the light ray 204 is totally internally reflected by the outer surface 128 of the extraction feature 116 and emitted through the base 122 thereof.

Once the slope dh/dR for the point 202d is calculated, the angle φ is calculated using Equation 1 for the next point 202e having incremental changes Δh, ΔR along the x- and y-coordinates h, R. The slope dh/dR for the point 202e is then determined using Equation 2, and the process is repeated until a known parameter is satisfied, for example, once the height distance h reaches the height M (FIG. 10A) of the first portion 124, or in some cases the total height M+N (FIG. 10A), of the extraction feature 116. The incremental change Δh may range from about 1 nm to about 1 μm, or may be a fraction, such as $\frac{1}{50}^{th}$, of the total height M+N (FIG. 10A) of the extraction feature 116.

In some embodiments, Equation 2 may be implemented with a conditional check to specify an upper limit for the slope dh/dR. The upper limit may be used in lieu of the calculated slope as desired. For example, referring to FIG. 10C, the upper limit may be specified as angle β, defined by an outer surface 132 of the second portion 126 relative to the base 122. Once the calculated slope dh/dR of points 202 along the outer surface 128 of the first portion 124 reaches the upper limit of angle β, each slope dh/dR for the subsequent points 202 along the outer surface 132 of the second portion 126 are constant and equal to β so as to form the conical shape.

In some embodiments, the optimization routine may determine the aperture radius $R_o$ for a preferred area ratio (i.e., ratio of aperture area to base area) subject to user defined conditions, such as the total height M+N (FIG. 10A), the critical angle θ (based on the relative indices of refraction), and the desired smallest angle defined by the sharpest angle φ of a light ray 212 that strikes the point 204N on the outer surface 132 at the base 122 of the extraction feature 116. Other user defined conditions may be specified as desired. In one embodiment, the outer surfaces 124, 132 designed in accordance with the description above results in extraction of over 95% of light out of the first surfaces 62a, 64a of the waveguide 42.

The shape, size, or density of extraction features 116 may be varied across the surfaces 62a, 64a of the waveguide 42 in either a regular or irregular fashion to produce a desired illuminance distribution. For example, a plurality of substrates 114a, 114b or films having differently shaped extraction features 93a, 93b respectively, may be bonded to the waveguide 42 to produce an asymmetric illumination distribution as shown in FIG. 24. The aperture diameters $d_a$, the base diameters $d_b$, and the heights H of the extraction features 93, 116 may all be the same or different, and may be varied over the surface(s) 62a, 64a of the waveguide 42 to provide varying illumination patterns, as desired. Further, it may be desirable to fabricate varying degrees of roughness, or specific optical features, such as a second set or array of geometric features, on an outer surface 130 (FIG. 7) of the member 114 in order to further provide control over the luminance and illuminance distributions. In other embodiments, the extraction features 93, 116 may be shaped to extract the luminance from both of the first and second surfaces 62a, 62b, 64a, and 64b.

A second outer surface 132 of the second portion 126 has a conical shape that forms an angle β with the base 122. The angle β may range from 1 degree to 90 degrees, preferably from 60 degrees to 90 degrees.

Figure 9A:
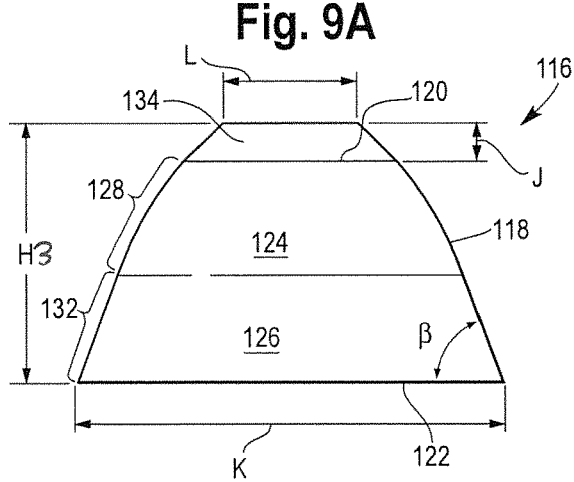
FIGS. 9A and 9B are side elevational and plan views, respectively, of a further embodiment of an extraction feature before application to a waveguide.
Figure 9B:
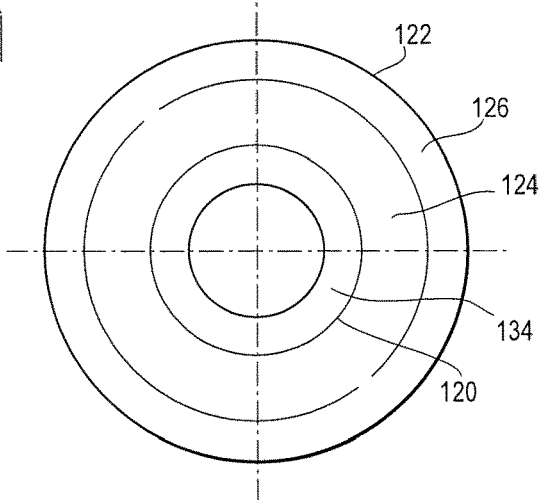
Figure 10A:
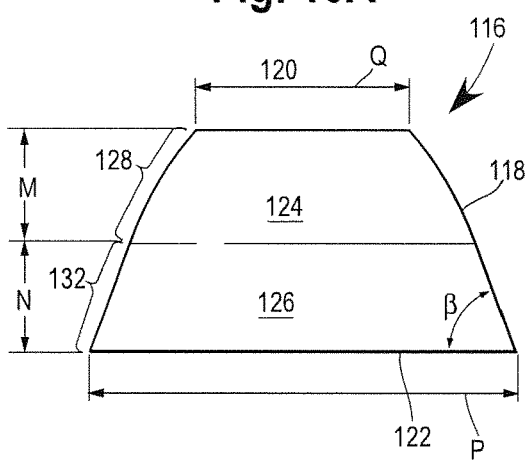
FIGS. 10A-10C are side elevational, plan, and further side elevational views, respectively, of the extraction features of FIGS. 9A and 9B after application to a waveguide.
Figure 10B:
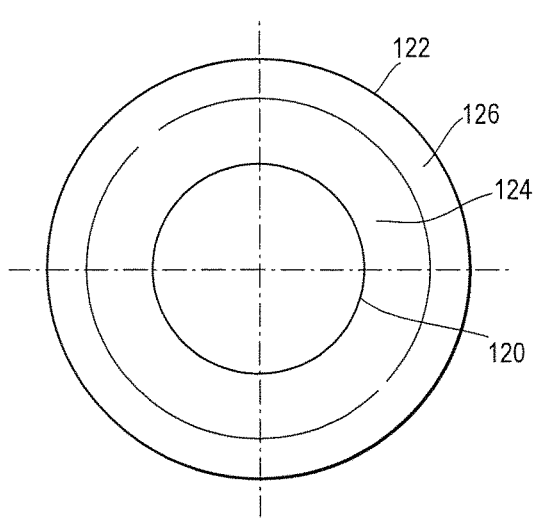
Figure 10C:
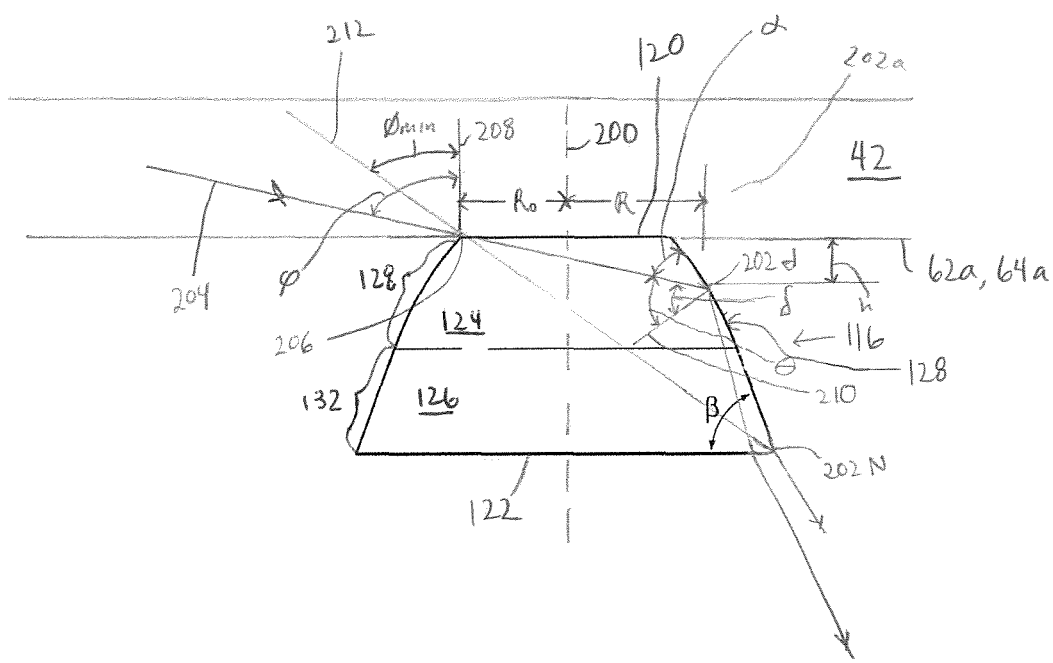

FIGS. 10A and 10B illustrate the extraction feature 84 of FIGS. 9A and 9B as disposed on the first surface of the waveguide. Example dimensions of the extraction feature of FIGS. 9A, 9B, 10A, and 10B are provided below. In one embodiment, a luminaire having a plurality of extraction features 116 of FIGS. 10A and 10B extracts approximately 97% of light traveling through the waveguide 42 from the first surfaces 62a, 64a such that approximately 3% of the light traveling through the waveguide 42 is emitted from the second surface 62b, 64b.

TABLE 2

| FIG. 9A | |
| --- | --- |
| H3 | 33 μm |
| J | 5 μm |
| K | 53.26 μm |
| L | 16.716 μm |
| B | 70 degrees |
| FIG. 10A | |
| M | 13.95 μm |
| N | 14.050 μm |
| P | 53.26 μm |
| Q | 26.716 μm |
| β | 70 degrees |

In still further embodiments, the extraction features 93, 116 may have an asymmetric shape. For example, the first portion 124 of the extraction feature 116 may be hemispherical and the base 122 may be elliptical such that the feature 116 appears as a truncated hemisphere when viewed from any cross-section, but appears as an ellipse or elongated circle when viewed from the top or bottom. Such asymmetric geometry would result in an asymmetric illuminance pattern such that may be desired for certain applications, such as roadway lighting. Further, the extraction features 93, 116 having an asymmetric cross-section along the height H may direct light into particular directions or quadrants below the luminaire. Extraction features 93, 116 with segmented cross-sections and top or bottom profiles consisting of a combination of curved surfaces and linear surfaces (such as an extractor that appears as a truncated hemisphere from the side, but appears as a star-shape or faceted shape from above) may be used for specific lighting applications requiring a very unique and defined illuminance distribution (e.g., stage lighting, architectural or cove lighting). Still further, extraction features having a generally conic shape (symmetric or asymmetric, truncated or not) may produce more collimated light beams in specific directions (e.g., for direct/indirect pendant lighting, downlighting, etc.).

In a further embodiment, the waveguide 42 is shaped such that the second surfaces 62b, 64b are relatively planar and the first surfaces 62a, 64a taper outwardly from the coupling cavity 60 toward an outer edge (not shown). The apertures 120 of the extraction features 93, 116 may be optically joined to the first surfaces 62a, 64a while the bases 122 of the extraction features 93, 116 are parallel to the second surfaces 62b, 64b. In this case, the extractor height H would range from relatively small adjacent the coupling cavity 60 to relatively large adjacent the outer edge (not shown). Further, the apertures 120 and the bases 122 would be disposed at angle relative to one another.

Figure 11:
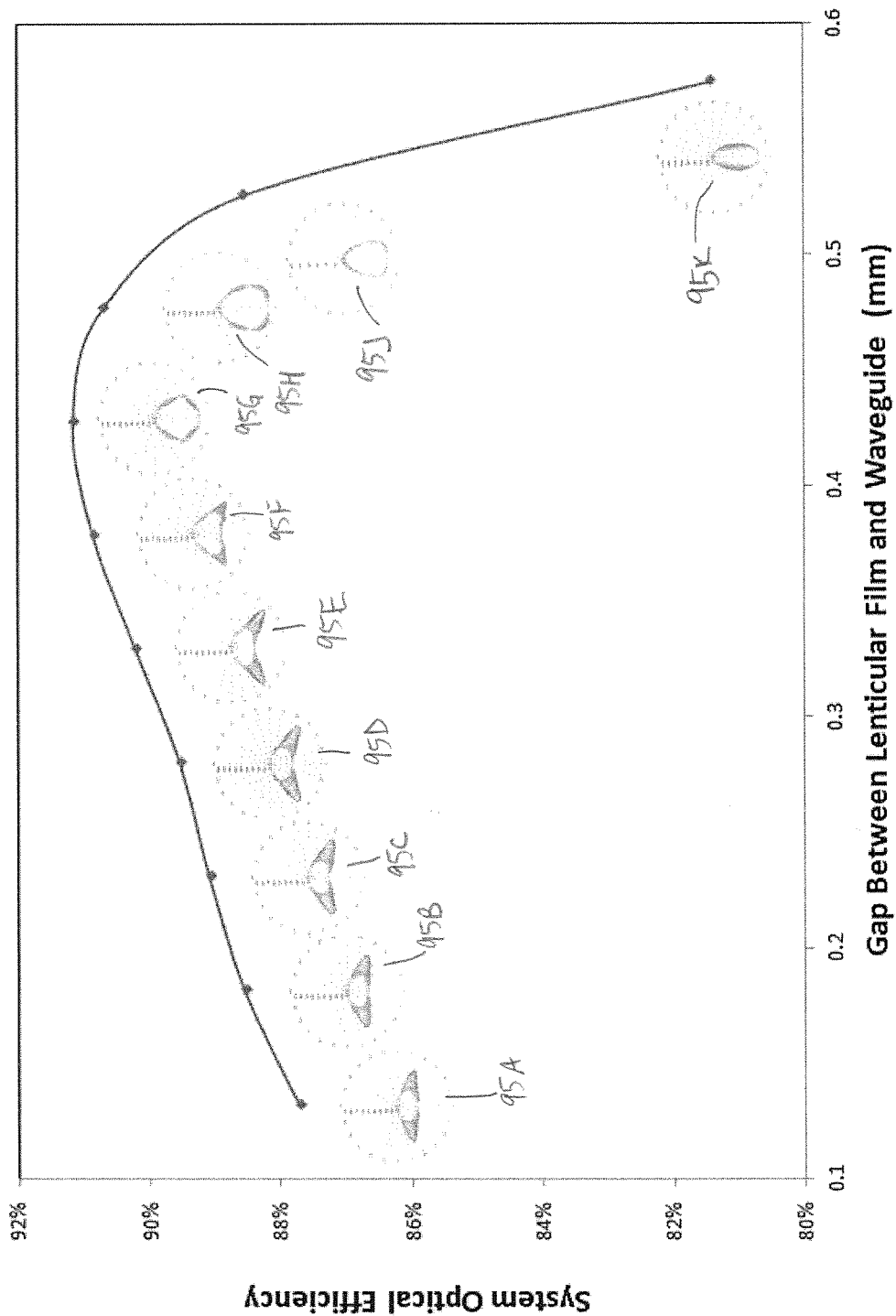
FIG. 11 is a graph illustrating system efficiency and light illumination distribution as a function of extraction feature height.
Figure 12:
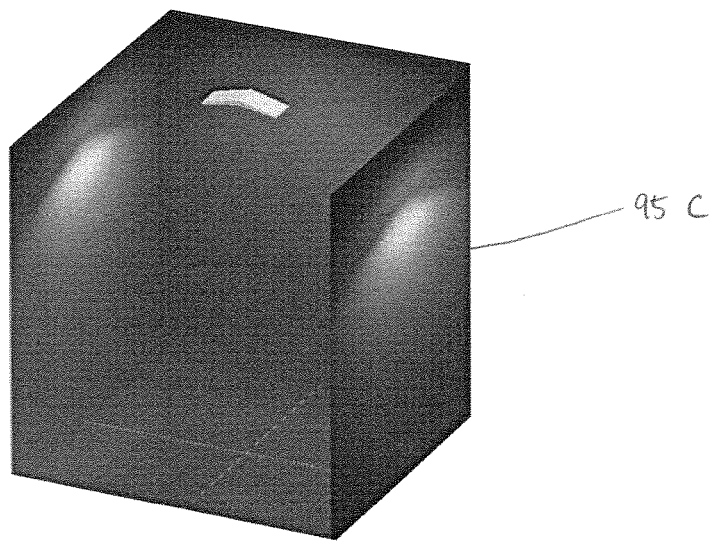
FIGS. 12, 14, 16, and 18 are isometric views illustrating different light illumination distributions developed by the luminaire of FIG. 1 in response to application of differing electrical power parameters to the LEDs thereof.
Figure 13:
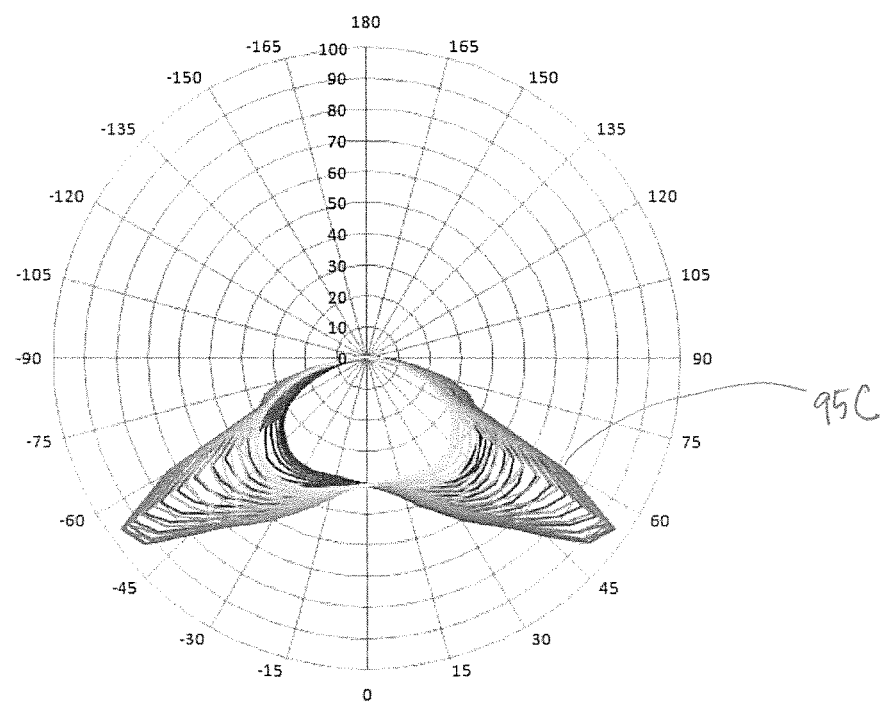
FIGS. 13, 15, 17, and 19 are graphs illustrating the illumination distributions of FIGS. 12, 14, 16, and 18, respectively.
Figure 14:
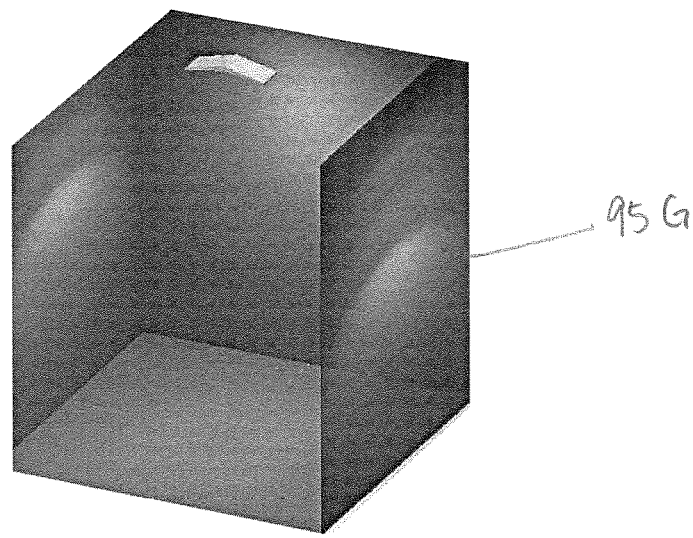
Figure 15:
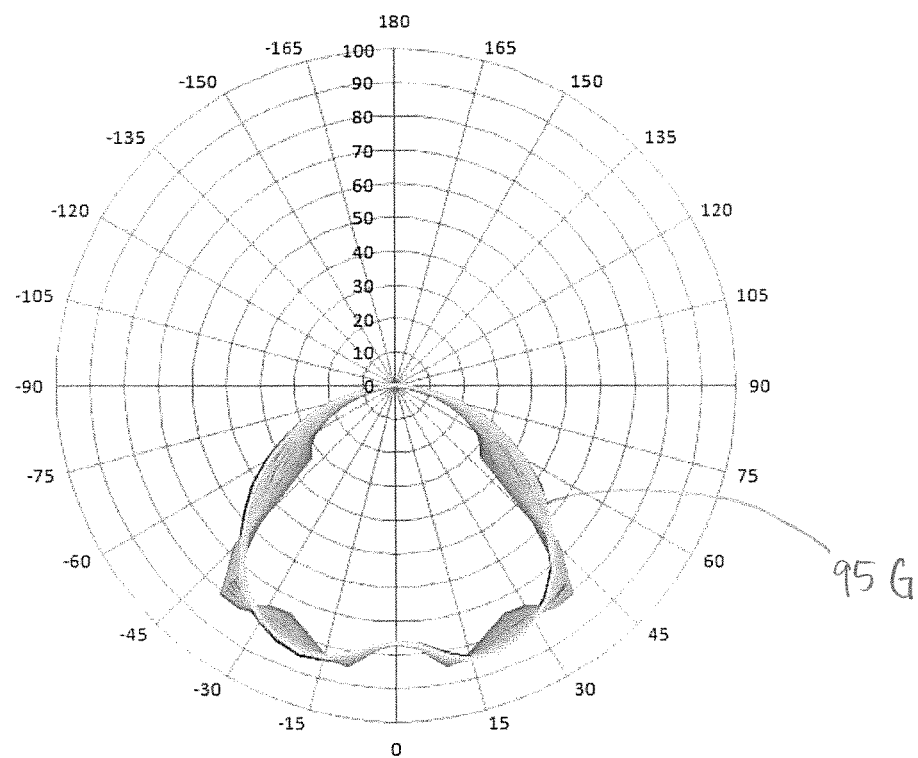
Figure 16:
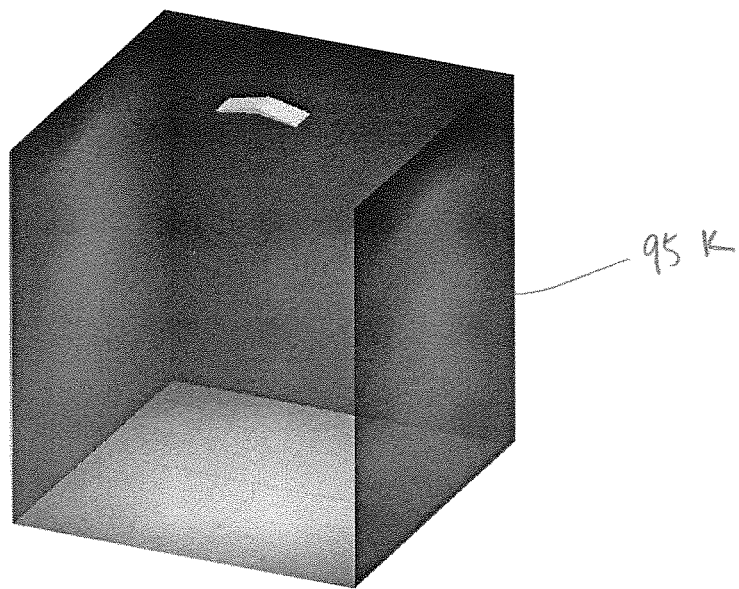
Figure 17:
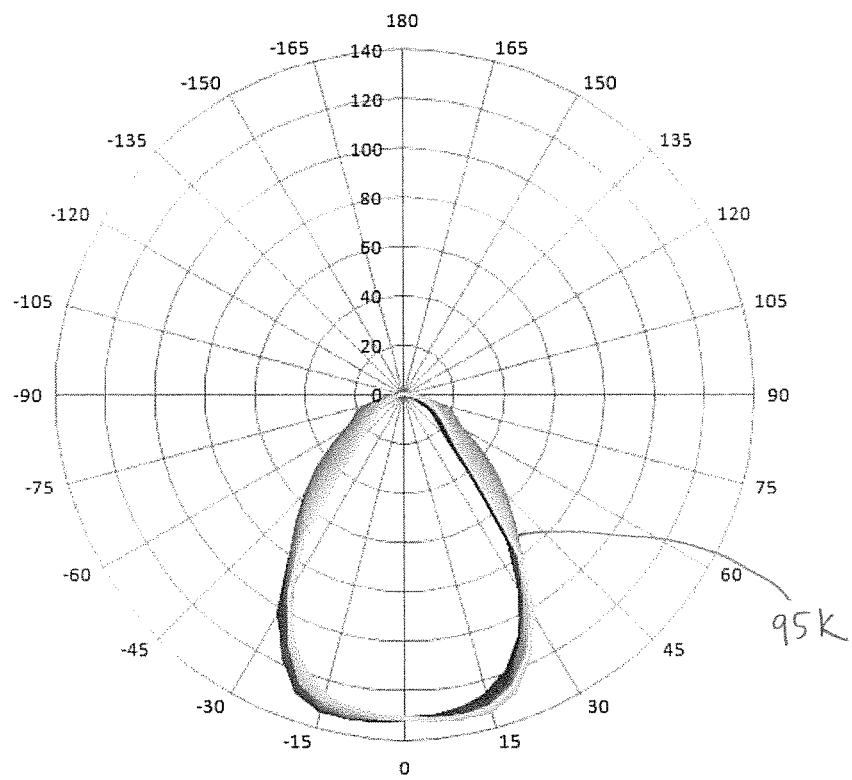

As seen in FIG. 11, a luminaire including at least one waveguide 42 that has features 93 disposed thereon produces a luminous intensity pattern or distribution that varies with feature height (the luminous flux distributions shown in the FIG. assume that the features 93 of all of the waveguides are all of substantially the same diameter). As seen in the FIG., the luminous intensity pattern varies from a "wall-wash" distribution (i.e., a distribution having a significant side-to-side illumination component) at feature heights of about 279 micrometers, to a general or "near-lambertian" distribution at a feature height of about 427 micrometers, to a task lighting or "spotlight" distribution at a feature height of about 550 micrometers. Generally, the luminous flux variances result from variations in optical coupling surface area and extractor aperture area between the features 93 and the waveguide 42 as the cross-sectional dimensions of the interface between features 93 and the waveguide vary with feature (truncation) height.

Figure 18:
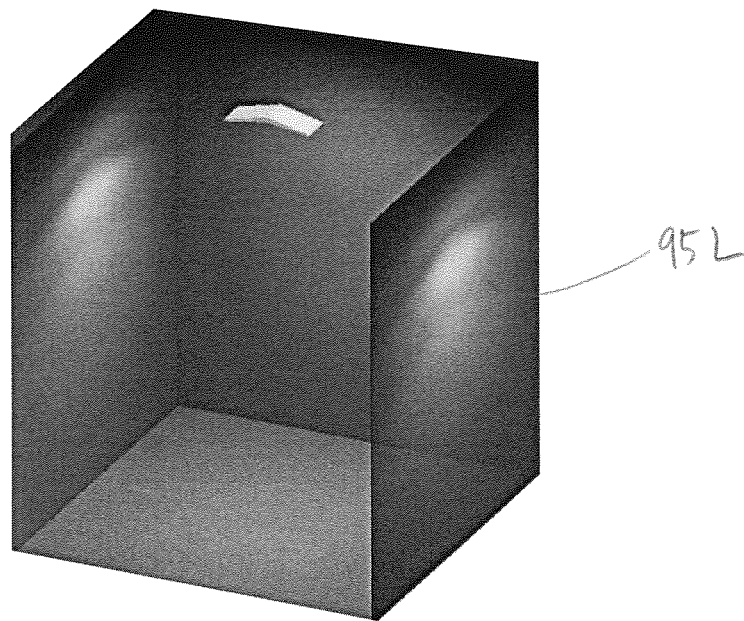
Figure 19:
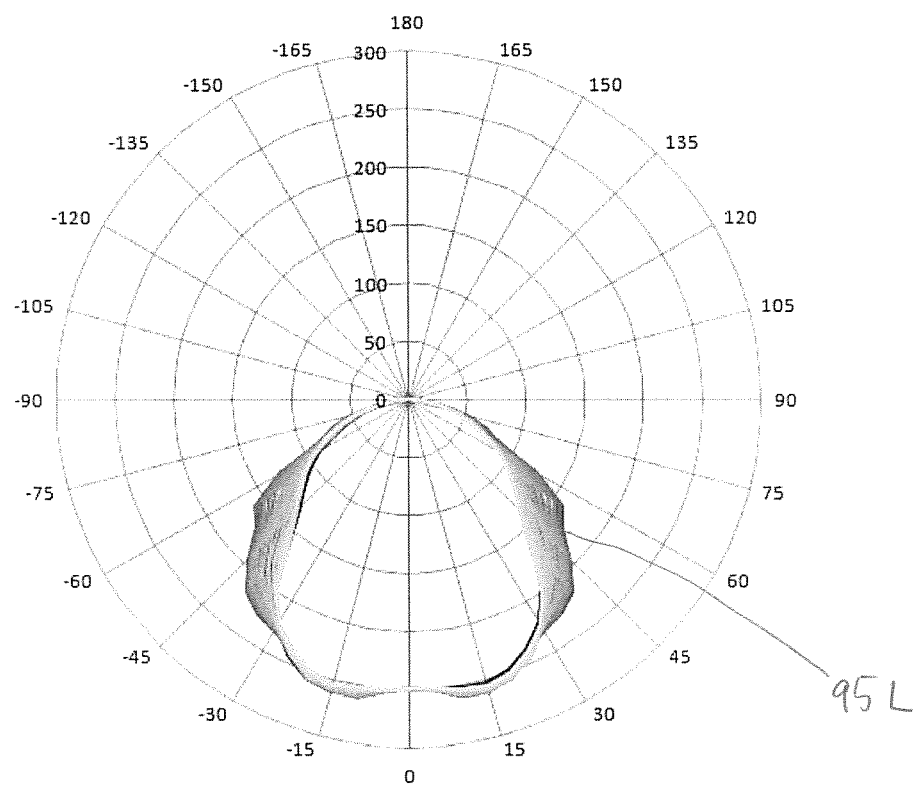
Figure 20:
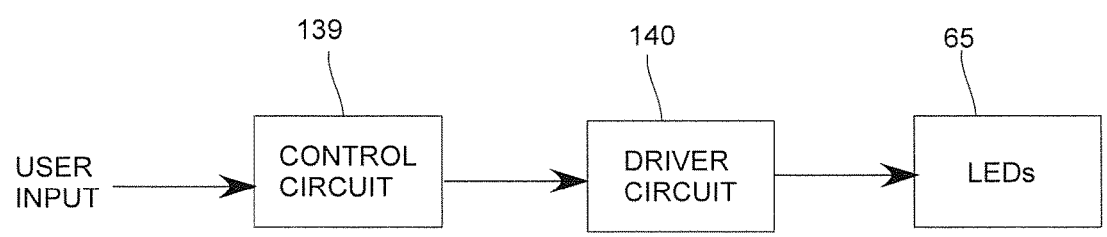
FIG. 20 is a block diagram of circuits for operating the LEDs of the luminaire of FIG. 1.
Figure 21:
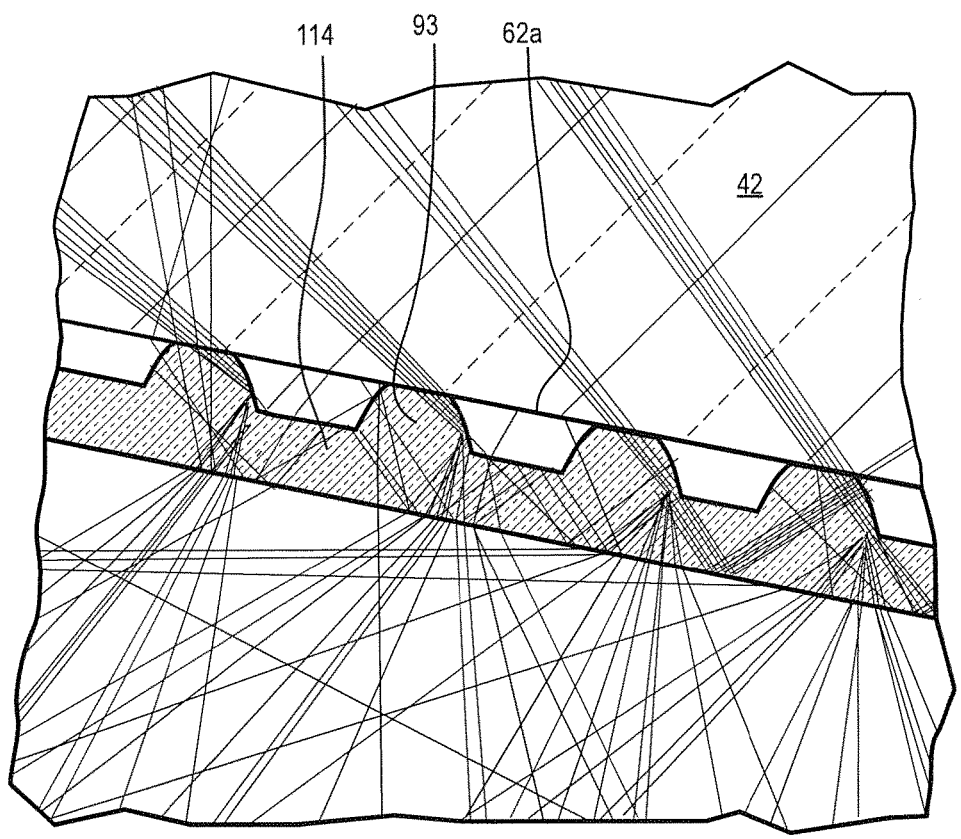
FIG. 21 is an enlarged fragmentary side elevational view of the waveguide of FIG. 1 with light extraction features applied thereto in which the indices of refraction of the light extraction features and the waveguide are approximately the same.
Figure 22:
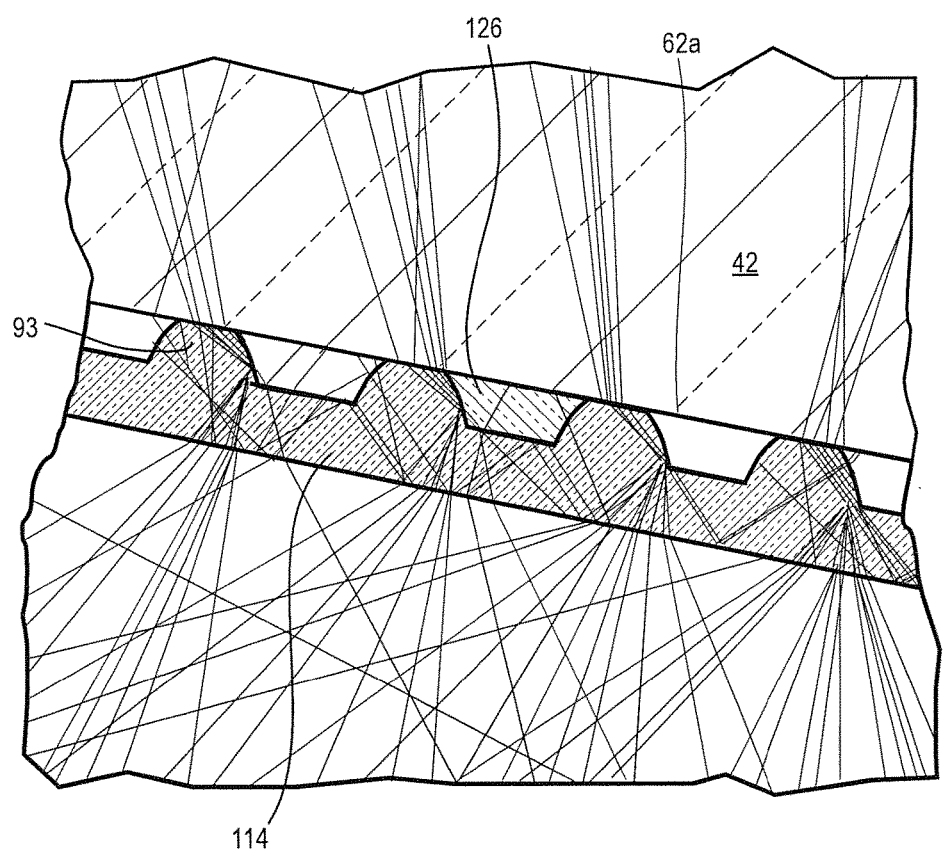
FIG. 22 is an enlarged fragmentary side elevational view of the waveguide of FIG. 1 with light extraction features applied thereto in which the indices of refraction of the light extraction features and the waveguide are different.

By providing waveguides 42 with different feature heights in a single luminaire and controlling the electrical power supplied to each set of LEDs 65 associated with each waveguide 42, one can achieve a single luminous intensity patterns or a combination of luminous intensity patterns. In the illustrated example, and with reference to FIGS. 3 and 4, the luminaire 40 includes three waveguides 42a, 42d, 42g including features 93 disposed thereon having heights of about 279 micrometers, three waveguides 42b, 42e, 42h including features 93 disposed thereon having heights of about 427 micrometers, and the remaining three waveguides 42c, 42f, 42i including features 93 disposed thereon having heights of about 550 micrometers. Nine sets of LED elements or modules 65a-65i (FIG. 3A) are associated with and disposed in cavities 60a-60i of the waveguides 42a-42i, respectively. Referring to FIG. 20, a control circuit 139 and a driver circuit 140 are responsive to a user or other input (which may be a fixed or variable signal) and varies a parameter of electrical power (for, example, drive current) to each of the LED elements or modules 65a-65i to obtain a desired or commanded illumination distribution. Thus, for example, full or partial drive current may be delivered by the circuits 139, 140 to the LED elements or modules 65a, 65d, and 65g and no drive current may be supplied to the remaining LED elements or modules 65b, 65c, 65e, 65f, 65h, and 65i so that the luminaire 40 develops the wall-wash luminous intensity pattern or distribution (FIGS. 12 and 13) at a light intensity dependent upon the magnitude of the drive current. Similarly, full or partial drive current may be supplied to either the LED elements or modules 65b, 65e, 65h or the LED elements or modules 65c, 65f, 65i and no drive current supplied to the remaining LED elements or modules 65a, 65d, 65g to cause the luminaire 40 to develop the near-lambertian luminous intensity pattern (FIGS. 14 and 15) or spot luminous intensity pattern (FIGS. 16 and 17), respectively. Again, the intensity of the light is determined by the magnitude of the supplied drive current. Combined luminous flux distributions are obtained by providing drive currents to the LEDs 65 associated with combinations of the waveguides 42. Further, in one embodiment, a first group of LEDs 65 associated with waveguides 42a, 42d, 42g may have a first color and/or color temperature, a second group of LEDs 65 associated with waveguides 42b, 42e, 42h may have a second color and/or color temperature, and a third group of LEDs 65 associated with waveguides 42c, 42f, 42i may have a third color and/or color temperature such that variation in drive currents to the LEDs 65 results in different color distributions. Thus, for example, a combined wall-wash and lambertian luminous intensity pattern or distribution may be obtained by providing drive currents of desired magnitudes to the LED elements or modules 65a, 65d, 65g and 65b, 65e, 65h and no drive current to the remaining LED elements or modules 65c, 65f, 65i. A combined wall-wash and spot luminous intensity pattern or distribution may be obtained by supplying drive currents to the LED elements or modules 65a, 65d, 65g and 65c, 65f, 65i and no drive current to the LED elements or modules 65b, 65e, 65h and a combined lambertian and spot distribution may be obtained by supplying drive currents to the LED elements or modules 65b, 65e, 65h and 65c, 65f, 65i and no drive current to the LED elements or modules 65a, 65d, 65g. Still further, a combined wall-wash, lambertian and spot luminous intensity pattern or distribution (seen in FIGS. 18 and 19) may be obtained by supplying drive currents to all of the LED elements or modules 65a-65i. The magnitudes of the drive currents supplied to the LED elements or modules 65 associated with the waveguides 42 determine the intensities of the distributions developed by such waveguides 42. Thus, for example, full drive current magnitudes supplied by the circuits 139, 140 to the LED elements or modules 65a, 65d, 65g and one-half drive current supplied to the remaining LED elements or modules 65b, 65c, 65e, 65f, 65h, and 65i results in a relatively high intensity wall-wash luminous flux distribution and lesser intensity lambertian and spot luminous flux distributions combined with the wall-wash distribution. An infinite range of combinations is possible, as should be evident.

Other parameters relative to the luminaire 40 could be varied to obtain other effects. For example, the waveguides 42a, 42d, 42g may all be of a first overall shape, the waveguides 42b, 42e, 42h may all be of a second overall shape the same or different than the first overall shape, and/or the waveguides 42c, 42f, 42i may be of a third overall shape the same or different than one or both of the first and second overall shapes. The features 93 on the waveguides 42a, 42d, 42g may all have a fourth shape, the features 93 on the waveguides 42b, 42e, 42h may all have a fifth shape the same or different than the fourth shape, and/or the features 93 on the waveguides 42c, 42f, 42i may have a sixth shape the same or different than one or both of the fourth and fifth overall shapes. Further, the LED elements or modules 65a, 65d, 65g may emit the same first color or first plurality of colors, the LED elements or modules 65b, 65e, 65h may emit the same second color or second plurality of colors the same or different than the first color or first plurality of colors, and/or the LED elements or modules 65c, 65f, 65i may emit the same third color or third plurality of colors the same or different than the first and/or second color or first and/or second plurality of colors. Still further, all or some of the overall shapes of the waveguides 42, all or some of the shapes, sizes, and/or arrangements of features 93 on one or more of the substrates 114, and/or all or some of the LED element or module colors or plurality of colors may be the same or different to obtain varying combinations of light luminous flux distributions and/or colors. Thus, different light illumination parameters may be obtained for each light luminous flux distribution, such as illumination shape, color, intensity and/or the like and/or more or fewer than three distributions can be obtained by adding or omitting waveguides 42, reducing or increasing drive current to one or more LED elements or modules or pluralities of such elements or modules, as appropriate, etc. In fact, one or more parameters of electric power delivered to individual LEDs elements or modules may be controlled by a user via the circuits 139, 140 in turn to control one or more luminaire optical parameters including, but not limited to, luminance distribution and/or color, color saturation, and/or color temperature.

Any of the embodiments disclosed herein may include a power circuit having a buck regulator, a boost regulator, a buck-boost regulator, a SEPIC power supply, or the like, and may comprise a driver circuit as disclosed in U.S. patent application Ser. No. 14/291,829, filed May 30, 2014, entitled "High Efficiency Driver Circuit with Fast Response" by Hu et al. or U.S. patent application Ser. No. 14/292,001, filed May 30, 2014, entitled "SEPIC Driver Circuit with Low input Current Ripple" by Flu et al. incorporated by reference herein. The circuit may further be used with light control circuitry that controls color temperature of any of the embodiments disclosed herein in accordance with user input such as disclosed in U.S. patent application Ser. No. 14/292, 286, filed May 30, 2014, entitled "Lighting Fixture Providing Variable CCT" by Pope et al. incorporated by reference herein.

Further, any of the embodiments disclosed herein may include one or more communication components forming a part of the light control circuitry, such as an RF antenna that senses RF energy. The communication components may be included, for example, to allow the luminaire to communicate with other luminaires and/or with an external wireless controller, such as disclosed in U.S. patent application Ser. No. 13/782,040, filed Mar. 1, 2013, entitled "Lighting Fixture for Distributed Control" or U.S. provisional application No. 61/932,058, filed Jan. 27, 2014, entitled "Enhanced Network Lighting" both owned by the assignee of the present application and the disclosures of which are incorporated by reference herein. More generally, the control circuitry includes at least one of a network component, an RF component, a control component, and a sensor. The sensor, such as a knob-shaped sensor, may provide an indication of ambient lighting levels thereto and/or occupancy within the room or illuminated area. Such sensor may be integrated into the light control circuitry.

INDUSTRIAL APPLICABILITY

In summary, one or more light distributions can be developed by a luminaire by providing one or more sets of waveguides of differing optical characteristic(s) and controlling one or more parameters of electrical power to LEDs associated with such sets of waveguides.

In accordance with one aspect, a luminaire or lighting fixture provides an adjustable illuminance, luminance, and/or luminous flux distribution and/or color, color saturation, or color temperature. For example, a luminaire fixture having a range of possible luminous flux distributions including a wall-wash setting (e.g., for highlighting artwork), a general or lambertian setting for general illuminance, and a collimated or spotlight setting for task lighting. The various settings (or combinations of settings) could be adjusted via the control circuit 139 using a wall switch or wired/wireless data transfer from a mobile device or network. This enables a new class of task specific lighting adjustments for a single lighting system, allowing a user to tailor illuminance to suit both the workspace and the task at hand. This flexibility may be used in combination with other luminaire adjustments known in the art such as dimming, color/hue variation, motion detection, etc. For example, combining dynamic illuminance as disclosed herein with motion detection could allow task-specific lighting to follow an occupant through a room/building, or allow parkway lights to follow pedestrians, thereby providing illumination where it is needed most. Dynamic or adjustable illuminance systems can also provide safety benefits, with specific lighting conditions designated for emergency conditions, and can also provide energy savings, with light more efficiently distributed into areas critical for the task at hand. Different illuminance areas may overlap.

The adjustable/dynamic luminance aspect of the embodiments disclosed herein could be used to tailor and/or minimize glare for specific tasks and/or situations, as well as provide aesthetic opportunities, such as having the luminaire display an image that also provides illumination for the room. Alternatively or in addition, a luminaire may provide colored areas of light and/or one or more images, including effects such as clouds moving across a blue illuminated ceiling. Other applications could enhance advertising or branding by having the luminaire display messages while providing illuminance, either in an adjustable (e.g., via wall switch or network) or dynamic (continuously changing) manner.

The embodiments disclosed herein may be used for general lighting, energy efficient lighting, task-specific lighting, emergency lighting, advertising, and other applications. For general lighting, at least some of the luminaires preferably require a total luminaire output of at least about 100 lumens or greater, and, in some embodiments, a total luminaire output of at least about 3,000 lumens, and, in other embodiments, a total lumen output of about 10,000 lumens to about 20,000 lumens. For example, a total lumen output of up to 10,000 lumens may be desired in some industrial and business lighting applications such as warehouse lighting. Further, the luminaires disclosed herein preferably have a color temperature of between about 2500 degrees Kelvin and about 6200 degrees Kelvin, and, in some embodiments, between about 2500 degrees Kelvin and about 5000 degrees Kelvin, and, in other embodiments, between 2700 and 3500 degrees Kelvin. Also, at least some of the luminaires disclosed herein preferably exhibit an efficacy of at least about 80 lumens per watt, and more preferably at least about 100 lumens per watt, and most preferably at least about 120 lumens per watt. Further, in some of the luminaires described herein, the waveguide or waveguides exhibit an optical efficiency of at least about 80 percent, preferably, at least about 90 percent, and most preferably, at least about 95 percent. Further, at least some of the luminaires disclosed herein preferably exhibit an overall efficiency (i.e., light extracted out of the waveguide divided by light injected into the waveguide) of at least about 70 percent, preferably, at least about 80 percent, and most preferably at least about 90 percent. A color rendition index (CRI) of at least about 80 is preferably attained by at least some of the luminaires disclosed herein, with a CRI of at least about 88 being more preferable, and at least about 90 being most preferable. Some luminaires exhibit a CRI of at least about 90 while maintaining a relatively high efficiency. Any desired form factor and particular output light distribution, such as a butterfly light distribution, could be achieved, including up and down light distributions or up only or down only distributions, etc.

When one uses a relatively small light source which emits into a broad (e.g., Lambertian) angular distribution (common for LED-based light sources), the conservation of etendue, as generally understood in the art, requires an optical system having a large emission area to achieve a narrow (collimated) angular light distribution. In the case of parabolic reflectors, a large optic is thus generally required to achieve high levels of collimation. In order to achieve a large emission area in a more compact design, the prior art has relied on the use of Fresnel lenses, which utilize refractive optical surfaces to direct and collimate the light. Fresnel lenses, however, are generally planar in nature, and are therefore not well suited to re-directing high-angle light emitted by the source, leading to a loss in optical efficiency. In contrast, in the embodiments described herein, light is coupled into the optic, where primarily TIR is used for re-direction and collimation. This coupling allows the full range of angular emission from the source, including high-angle light, to be re-directed and collimated, resulting in higher optical efficiency in a more compact form factor. One example of a waveguide having a high efficiency in a compact form factor is described in U.S. patent application Ser. No. 13/839,949, filed Mar. 15, 2013, entitled "Optical Waveguide and Lamp Including Same".

In at least some of the present embodiments the distribution and direction of light within the waveguide is better known, and hence, light is controlled and extracted in a more controlled fashion. In standard optical waveguides, light bounces back and forth through the waveguide. In the present embodiments, light is extracted as much as possible over one pass through the waveguide to minimize losses.

In some embodiments, one may wish to control the light rays such that at least some of the rays are collimated, but in the same or other embodiments, one may also wish to control other or all of the light rays to increase the angular dispersion thereof so that such light is not collimated. In some embodiments, one might wish to collimate to narrow ranges, while in other cases, one might wish to undertake the opposite.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure.

We claim:

1. A luminaire, comprising:
a first waveguide having a first region with a first light extraction feature that emits a first luminous intensity pattern and a second region with a second light extraction feature that emits a second luminous intensity pattern different from the first luminous intensity pattern, the first light extraction feature being different from the second light extraction feature;
a second waveguide having a third region with a third light extraction feature that emits a third luminous intensity pattern and a fourth region with a fourth light extraction feature that emits a fourth luminous intensity pattern different from the third luminous intensity pattern, the third light extraction feature being different from the fourth light extraction feature, and a combination of the first light extraction feature and the second light extraction feature being different than a combination of the third light extraction feature and the fourth light extraction feature;
a plurality of LED elements comprising a first LED element and a second LED element for emitting light to the first waveguide and a third LED element and a fourth LED element for emitting light to the second waveguide; and circuitry to control at least one parameter of electrical power delivered to at least one of the first LED element, the second LED element, the third LED element and the fourth LED element to cause the luminaire to produce a selected one of a plurality of luminous intensity patterns, the first waveguide and the second waveguide being supported in a mounting apparatus to provide a light fixture where the light emitted from the first waveguide and the second waveguide is controllable to obtain a commanded illumination pattern.

2. The luminaire of claim 1, wherein the plurality of LED elements includes LED elements having the same color.

3. The luminaire of claim 1, wherein the plurality of LED elements includes LED elements having different color temperatures.

4. The luminaire of claim 1, further comprising a plurality of sets of LED elements, wherein each set of LED elements is associated with one of the luminous intensity patterns.

5. The luminaire of claim 1, wherein the first waveguide includes a light emission surface and the first light extraction feature and the second light extraction feature are disposed adjacent the light emission surface.

6. The luminaire of claim 5, further comprising a substrate arranged such that the first light extraction feature and the second light extraction feature are disposed between the substrate and the light emission surface.

7. The luminaire of claim 5, wherein the first light extraction feature and the second light extraction feature comprise protrusions.

8. The luminaire of claim 7, further comprising a first plurality of protrusions having a first height that are associated with the first region, and a second plurality of protrusions having a second height different than the first height that are associated with the second region.

9. The luminaire of claim 7, wherein the first waveguide comprises a plurality of first waveguides and the second waveguide comprises a plurality of second waveguides, and further comprising a plurality of third waveguides wherein each of the plurality of first waveguides includes protrusions having a first shape, each of the plurality of second waveguides includes protrusions of a second shape different than the first shape, and each of the plurality of third waveguides includes protrusions of a third shape different than the first and second shapes.

10. The luminaire of claim 9, wherein a first set of LED elements, a second set of LED elements, and a third set of LED elements are associated with the plurality of first waveguides, the plurality of second waveguides, and the plurality of third waveguides, respectively.

11. The luminaire of claim 10, wherein the circuit applies electrical power to the first, second, and third groups of LED elements to cause the luminaire to develop one of first, second, and third luminous intensity patterns, respectively.

12. The luminaire of claim 11, wherein the first luminous intensity pattern comprises a wall wash pattern.

13. The luminaire of claim 11, wherein the second luminous intensity pattern comprises a lambertian pattern.

14. The luminaire of claim 11, wherein the third luminous intensity pattern comprises a spot pattern.

15. The luminaire of claim 1, wherein the at least one waveguide exhibits an optical efficiency of at least about 90%.

16. The luminaire of claim 1, wherein the at least one waveguide exhibits an optical efficiency of at least about 95%.

17. A luminaire, comprising:

a plurality of waveguides each having a light emission surface including a plurality of extraction features;

the plurality of extraction features on at least one of the light emission surfaces having a first light extraction characteristic and the plurality of extraction features on at least another one of the light emission surfaces having a second light extraction characteristic where the plurality of extraction features on the at least one of the light emission surfaces is different than the light extraction characteristic of the plurality of extraction features on the at least another one of the light emission surfaces such that the luminous intensity pattern emitted by the at least one of the light emission surfaces is different than the luminous intensity pattern emitted by the at least another one of the light emission surfaces regardless of the spatial orientation of the plurality of waveguides;

a plurality of LED elements associated with the plurality of waveguides; and circuitry controlling at least one parameter of electrical power delivered to at least some of the LED elements of the plurality of LED elements to cause the luminaire to produce a selected one of a plurality of luminous intensity patterns, the plurality of waveguides being supported in a mounting apparatus to provide a light fixture where the light emitted from the plurality of waveguides is controllable to obtain the selected one of a plurality of luminous intensity patterns wherein the selected one of a plurality of luminous intensity patterns includes at least one of a wall-wash luminous intensity pattern, a near-lambertian luminous intensity pattern, and a spot-light luminous intensity pattern.

18. The luminaire of claim 17, wherein the plurality of extraction features is carried by at least one substrate.

19. The luminaire of claim 18, wherein the plurality of extraction features is carried by multiple substrates each disposed on an associated one of the emission surfaces.

20. The luminaire of claim 19, wherein extraction features are disposed between each substrate and the associated light emission surfaces, and wherein a shape of extraction features carried by one of the substrates is different than a shape of extraction features carried by another of the substrates.

21. The luminaire of claim 19, wherein the plurality of waveguides includes a first plurality of waveguides, a second plurality of waveguides and a third plurality of waveguides wherein each of the first plurality of waveguides includes extraction features comprising protrusions having a first shape, each of the second plurality of waveguides includes extraction features comprising protrusions of a second shape different than the first shape, and each of the third plurality of waveguides includes extraction features comprising protrusions of a third shape different than the first and second shapes.

22. The luminaire of claim 21, wherein first, second, and third sets of LED elements are associated with the first, second, and third plurality of waveguides, and wherein the circuit applies electrical power to at least one of the first, second, and third sets of LED elements in dependence upon a selection signal to cause the luminaire to develop one of first, second, and third luminous intensity patterns.

23. The luminaire of claim 22, wherein the first luminous intensity pattern comprises a wall wash pattern.

24. The luminaire of claim 22, wherein the second luminous intensity pattern comprises a lambertian pattern.

25. The luminaire of claim 22, wherein the third luminous intensity pattern comprises a spot pattern.

26. The luminaire of claim 17, wherein the luminaire exhibits an overall efficiency of at least about 90%.

27. A luminaire, comprising:
multiple waveguides each having at least two light emission surfaces and a light coupling feature, wherein the waveguides have substantially identical shapes;
a mounting apparatus that maintains the multiple waveguides in a side-by-side array wherein each waveguide is disposed adjacent at least one other waveguide; an optical isolation member disposed between adjacent waveguides;
extraction features disposed on each light emission surface of the waveguides, the extraction features comprising protrusions and disposed on an associated light emission surface, wherein the protrusions associated with one of the light emission surfaces has a first light extraction characteristic and the protrusions associated with another of the light emission surfaces has a second light extraction characteristic different than the first light extraction characteristic;
LED elements optically coupled to an optical coupling feature of each waveguide; and
circuitry adapted to apply electrical power to at least some of the LED elements to cause the luminaire to produce a selected one of a number of luminous intensity patterns.

28. The luminaire of claim 27, wherein the protrusions all have a substantially identical truncated partially spherical shape.

29. The luminaire of claim 28, wherein the protrusions are equally spaced from one another.

30. The luminaire of claim 29, wherein the multiple waveguides include first, second, and third groups of waveguides wherein each light emission surface of the first group of waveguides is associated with protrusions having a first height, each light emission surface of the second group of waveguides is associated with protrusions of a second height different than the first height, and each light emission surface of the third group of waveguides is associated with protrusions of a third height different than the first and second heights.

31. The luminaire of claim 29, wherein the first height is between about 170 μm and about 350 μm, the second height is between about 350 μm and about 475 μm, and the third height is between about 475 μm and about 580 μm.

32. The luminaire of claim 31, wherein the first height is about 280 μm, the second height is about 430 μm, and the third height is about 550 μm.

33. The luminaire of claim 31, wherein the protrusions are carried by an associated substrate portion, and wherein each of the protrusions has a circular base where the protrusion intersects the substrate portion and partial spherical side walls extending between the circular base and a planar top surface.

34. The luminaire of claim 33, wherein each circular base has a diameter between about 0.1 μm and about 10 mm.

35. The luminaire of claim 34, wherein each circular base has a diameter of about 1 mm.

36. The luminaire of claim 35, wherein the protrusions are disposed in rows on each substrate portion and each protrusion is spaced from an adjacent protrusion in a same row by a center-to-center spacing distance between about 1.2 mm and about 20 mm.

37. The luminaire of claim 36, wherein the protrusions are disposed in rows on each substrate portion and each protrusion is spaced from an adjacent protrusion in a same row by a center-to-center spacing distance of about 1.25 mm.

38. The luminaire of claim 27, wherein the LED elements comprise LED chips.

39. A luminaire, comprising:
a plurality of waveguides each having a light emission surface;
a plurality of extraction features disposed on the light emission surfaces of the waveguides, wherein the extraction features on at least one of the light emission surfaces have a different light extraction characteristic than the extraction features on at least another of the light emission surfaces, wherein the plurality of extraction features is carried by multiple substrates each disposed on an associated one of the emission surfaces and wherein the plurality of waveguides includes a first plurality of waveguides, a second plurality of waveguides and a third plurality of waveguides wherein each of the first plurality of waveguides includes extraction features comprising protrusions having a first shape, each of the second plurality of waveguides includes extraction features comprising protrusions of a second shape different than the first shape, and each of the third plurality of waveguides includes extraction features comprising protrusions of a third shape different than the first and second shapes;
a plurality of LED elements associated with the plurality of waveguides; and
circuitry controlling at least one parameter of electrical power delivered to at least some of the LED elements of the plurality of LED elements to cause the luminaire to produce a selected one of a plurality of luminous intensity patterns, the plurality of waveguides being supported in a mounting apparatus to provide a light fixture where the light emitted from the plurality of waveguides is controllable to obtain the selected one of a plurality of luminous intensity patterns wherein the selected one of a plurality of luminous intensity patterns includes at least one of a wall-wash luminous intensity pattern, a near-lambertian luminous intensity pattern, and a spot-light luminous intensity pattern.

* * * * *

UNITED STATES PATENT AND TRADEMARK OFFICE
CERTIFICATE OF CORRECTION

PATENT NO. : 10,209,429 B2
APPLICATION NO. : 14/472064
DATED : February 19, 2019
INVENTOR(S) : van de Ven et al.

Page 1 of 1

It is certified that error appears in the above-identified patent and that said Letters Patent is hereby corrected as shown below:

In the Specification

Column 6, Line 56: Please correct "F 5" to read -- FIG. 5 --

Column 6, Line 58: Please correct "a of" to read -- are of --

Column 13, Line 57: Please correct "angle is" to read -- angle α is --

Signed and Sealed this
Ninth Day of July, 2019

Andrei Iancu
*Director of the United States Patent and Trademark Office*